(12) United States Patent
Chung et al.

(10) Patent No.: US 11,294,439 B2
(45) Date of Patent: Apr. 5, 2022

(54) CONNECTOR CONNECTED TO CAPACITOR FOR BLOCKING ABNORMAL VOLTAGE AND ELECTRONIC DEVICE HAVING SAME

(71) Applicant: Samsung Electronics Co., Ltd., Gyeonggi-do (KR)

(72) Inventors: Cheol-Yoon Chung, Gyeonggi-do (KR); June-Bum Lee, Gyeonggi-do (KR); Cheol-Ho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 693 days.

(21) Appl. No.: 16/196,539

(22) Filed: Nov. 20, 2018

(65) Prior Publication Data

US 2019/0155352 A1    May 23, 2019

(30) Foreign Application Priority Data

Nov. 23, 2017 (KR) .................. 10-2017-0157472

(51) Int. Cl.
*G06F 1/26* (2006.01)
*H02J 7/00* (2006.01)
*H02J 7/34* (2006.01)
*G06F 13/42* (2006.01)
*G06F 13/38* (2006.01)
*H01R 13/66* (2006.01)
(Continued)

(52) U.S. Cl.
CPC .............. *G06F 1/266* (2013.01); *G06F 1/263* (2013.01); *G06F 13/385* (2013.01); *G06F 13/4282* (2013.01); *H02J 7/0072* (2013.01); *H02J 7/345* (2013.01); *H01R 13/6625* (2013.01); *H01R 24/60* (2013.01); *H01R 2107/00* (2013.01)

(58) Field of Classification Search
CPC ........ G06F 1/266; G06F 1/263; G06F 13/385; G06F 13/4282; H02J 7/0072; H02J 7/345
See application file for complete search history.

(56) References Cited

U.S. PATENT DOCUMENTS 7,474,117 B1 * 1/2009 Bandholz ............ G06F 13/4072
326/22
9,612,615 B2   4/2017 Lin et al.
(Continued)

OTHER PUBLICATIONS

USB Implementers Forum, "USB 3.1 Engineering Change Notice: Rx AC Coupling Capacitor Option," Aug. 16, 2013 (Year: 2013).*
(Continued)

*Primary Examiner* — Phong H Dang
(74) *Attorney, Agent, or Firm* — The Farrell Law Firm, P.C.

(57) ABSTRACT

Disclosed is an electronic device including a power regulator; a processor; a connector comprising first power pins that electrically connect an external electronic device with the power regulator, and first data reception pins that are disposed adjacent to at least some of the first power pins and electrically connect second data transmission pins of a connector of the external electronic device with data reception terminals of the processor; and one or more first receiver capacitors that are electrically connected to the first data reception pins and to the processor in order to block power from leaking into the first data reception pins from the at least some of the first power pins.

18 Claims, 13 Drawing Sheets

(51) Int. Cl.
H01R 24/60 (2011.01)
H01R 107/00 (2006.01)

(56) References Cited

U.S. PATENT DOCUMENTS

| 9,647,721 | B2 | 5/2017 | Koshy | |
|---|---|---|---|---|
| 2009/0276546 | A1* | 11/2009 | Lui | G06F 13/4072 |
| | | | | 710/16 |
| 2014/0218045 | A1* | 8/2014 | Shoykhet | G06F 13/4081 |
| | | | | 324/538 |
| 2014/0223037 | A1* | 8/2014 | Minoo | G06F 1/28 |
| | | | | 710/16 |
| 2014/0256276 | A1* | 9/2014 | Li | H04B 3/30 |
| | | | | 455/230 |
| 2016/0156137 | A1* | 6/2016 | Pan | G06F 13/385 |
| | | | | 439/78 |
| 2017/0264060 | A1* | 9/2017 | Kimura | H01R 27/00 |
| 2020/0287334 | A1* | 9/2020 | Kulkarni | G06F 13/4022 |

OTHER PUBLICATIONS

Alan Berkema, et al. "Universal Serial Bus 3.1 Specification", Hewlett-Packard Company, et al.; Revision 1.0, Jun. 26, 2013.

* cited by examiner

CONNECTOR CONNECTED TO CAPACITOR FOR BLOCKING ABNORMAL VOLTAGE AND ELECTRONIC DEVICE HAVING SAME

CROSS-REFERENCE TO RELATED APPLICATION(S)

This application is based on and claims priority under 35 U.S.C. § 119 to Korean Patent Application No. 10-2017-0157472, filed on Nov. 23, 2017, in the Korean Intellectual Property Office, the disclosure of which is incorporated by reference herein in its entirety.

BACKGROUND

1. Field

The present disclosure relates generally to a connector of an electronic device that is capable of controlling an abnormal voltage that may be introduced during data reception from an external electronic device connected via the connector.

2. Description of Related Art

Various types of portable electronic devices have been developed for users to access a wide range of content. An electronic device has an interface (e.g., a connector) for connection with an external device, can be connected to various external devices through the interface, and can provide extended functions via a connection with an external device. The electronic device may include different types of connectors according to various interfaces.

A universal serial bus (USB) connector may provide an input/output standard for connecting various peripheral devices. The USB standard may include, for example, USB1.0/USB1.1, USB2.0, or USB3.0/3.1, along with USB3.0/USB3.1 that supports a super speed data transfer rate of 5 Gbits/s, and has a full-duplex mode, enabling two-way communication using separate channels for transmission and reception. A transmission channel and a reception channel may use differential signal transmission, and may include a positive pin and a negative pin to transfer a differential signal.

A USB connector includes data transmission and reception pins (e.g., USB 2.0 D+ pin, USB 3.1 TX pin, and USB 3.1 RX pin) for data communication, and a power supply pin (e.g., a USB cable charging power ($V_{BUS}$) pin) for supplying power from a host device to an attached electronic device. A mechanical breakage of the USB connector or foreign substances deposited in the connector may cause a fault in which a $V_{BUS}$ power source is connected to the data transmission and reception pins.

In this case, a power voltage of 20 V or higher may be applied through the $V_{BUS}$ pin to other pins, and the risk of the power voltage applied to the $V_{BUS}$ pin leaking to the data transmission and reception pins may occur due to the structure of the USB connector, wherein the data transmission and reception pins and the $V_{BUS}$ pin are disposed adjacent to each other.

In addition, undesired voltage (e.g., surge voltage caused by electrostatic discharge (ESD)) may be introduced into the data transmission and reception pins of the USB connector. In particular, since USB3.1 transmission and reception channels use a high-speed signal of 5 Gbps (or 2.5 GHz) for data transmission and reception, it may be difficult to apply a protection device for protecting an internal circuit or to apply an additional over-voltage protection (OVP) circuit.

SUMMARY

According to an aspect of the present disclosure, a connector (or an electronic device including the connector) may be provided that is connected to a capacitor or that is connected to various abnormal voltage cutoff circuits including the capacitor. The capacitor is capable of blocking abnormal voltage (e.g., surge voltage or leakage voltage) or an electric current that may be introduced into data transmission and reception pins among a plurality of pins of the connector.

In accordance with an aspect of the present disclosure, an electronic device includes a power regulator; a processor; a connector including first power pins that electrically connect an external electronic device with the power regulator, and first data reception pins that are disposed adjacent to at least some of the first power pins and electrically connect second data transmission pins of a connector of the external electronic device with data reception terminals of the processor; and one or more first receiver capacitors that are electrically connected to the first data reception pins and to the processor in order to block power from leaking into the first data reception pins from the at least some of the first power pins.

In accordance with an aspect of the present disclosure, an electronic device includes a processor; a universal serial bus (USB) connector including a transmission pin that electrically connects a reception pin of an external electronic device to a data transmission terminal of the processor, and a reception pin that electrically connects a transmission pin of the external electronic device to a data reception terminal of the processor; a first receiver capacitor that blocks power from the reception pin of the USB connector; and a first transmitter capacitor that blocks power from the transmission pin of the USB connector. The processor is configured to detect whether the external electronic device is connected or disconnected based on a time constant determined by the first transmitter capacitor, a second receiver capacitor connected to the reception pin of the external electronic device, and a resistor connected to the reception pin of the external electronic device and to a ground of the external electronic device.

In accordance with an aspect of the present disclosure, an electronic device includes: a processor; a universal serial bus (USB) connector including a reception pin that electrically connects a transmission pin of an external electronic device to a data reception terminal of the processor; and a first capacitor electrically connected to the reception pin and to the processor in order to block power from the reception pin of the USB connector.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
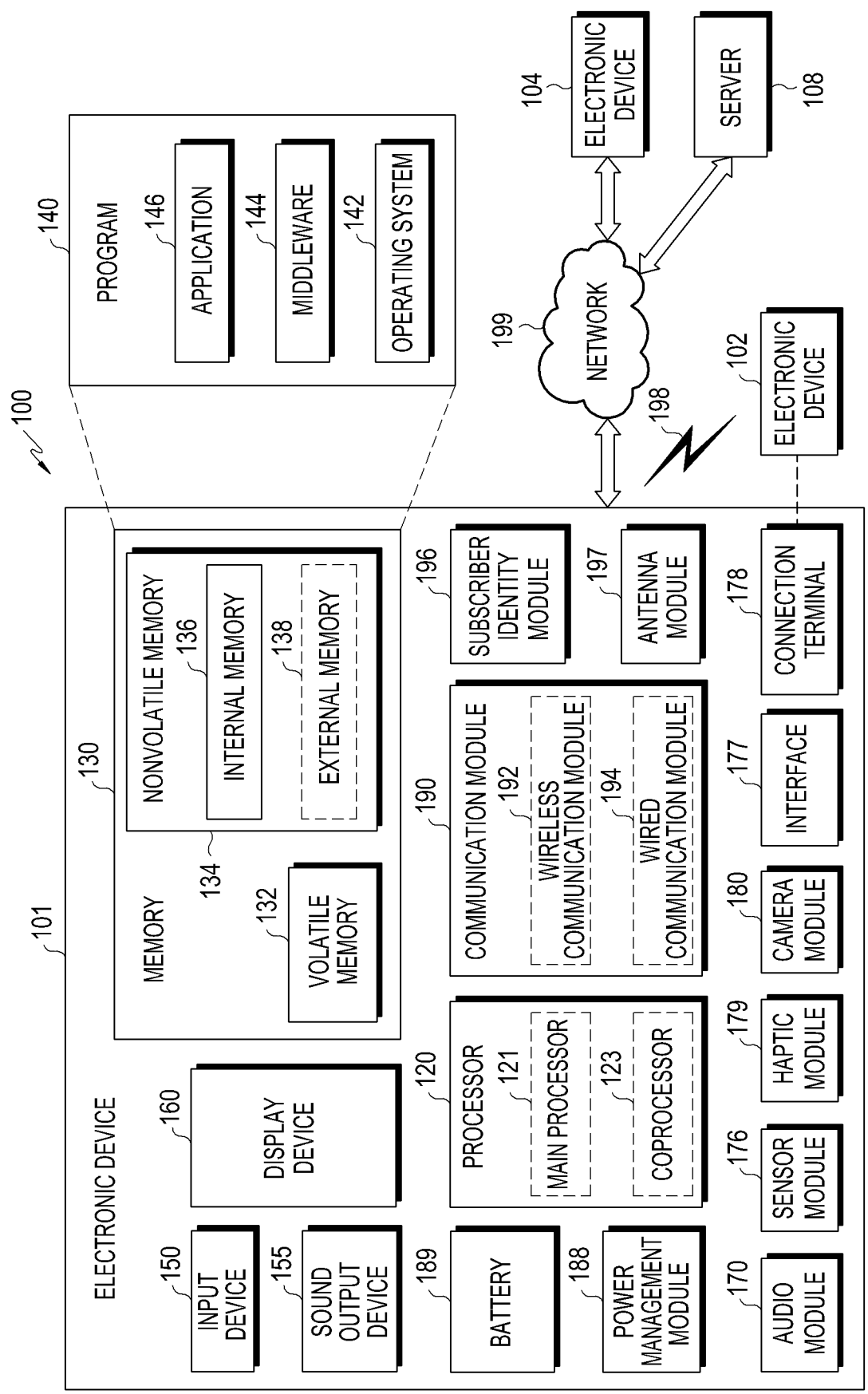
FIG. 1 is a block diagram illustrating an electronic device in a network environment, according to an embodiment.

FIG. 1 is a block diagram illustrating an electronic device 101 in a network environment 100, according to an embodiment.

Referring to FIG. 1, in the network environment 100, the electronic device 101 may communicate with an electronic device 102 via a first network 198 (e.g., short-range wireless communication), or may communicate with an electronic device 104 or a server 108 via a second network 199 (e.g., long-range wireless communication). The electronic device 101 may communicate with the electronic device 104 via the server 108. The electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identity module (SIM) 196, and an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illumination sensor) may be implemented as embedded in the display device 160 (e.g., a display).

The processor 120 may run, for example, software (e.g., a program 140) to control at least one other component (e.g., a hardware or software component) of the electronic device 101 coupled with the processor 120, and may perform various types of data processing or computation. According to an embodiment, as at least part of the data processing or computation, the processor 120 may load a command or data received from another component (e.g., the sensor module 176 or the communication module 190) into a volatile memory 132, process the command or the data stored in the volatile memory 132, and store the resulting data in a nonvolatile memory 134. According to an embodiment, the processor 120 may include a main processor 121 (e.g., a central processing unit (CPU) or an application processor (AP)) and a coprocessor 123 (e.g., a graphics processing unit (GPU), an image signal processor (ISP), a sensor hub processor, or a communications processor (CP)) that is operable independently from, or in conjunction with, the main processor 121. Additionally or alternatively, the coprocessor 123 may be adapted to consume less power than the main processor 121, or to be specific to a specified function. The coprocessor 123 may be implemented as separate from, or as part of the main processor 121.

The coprocessor 123 may control at least some of the functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 when the main processor 121 is in an active (e.g., executing an application) state. According to an embodiment, the coprocessor 123 (e.g., an image signal processor or a communications processor) may be implemented as a part of another component (e.g., the camera module 180 or the communication module 190) functionally related to the coprocessor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include volatile memory 132 or nonvolatile memory 134.

The program 140 may be stored in the memory 140 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., pressure sensor) adapted to measure the intensity of force incurred by the touch.

The audio module 170 may convert a sound and an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a USB interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., vibrations or a movement) or an electrical stimulus which may be recognized by a user via tactile sensation or kinesthetic sensation. According to an embodiment, the haptic module 179 may include, for example, a motor, a piezoelectric element, or an electrical stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a non-rechargeable primary battery, a rechargeable secondary battery, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently from the processor 120 (e.g., an application processor) and supports a direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., a LAN or wide area network (WAN))). These various types of communication modules 190 may be implemented as a single component (e.g., a single chip) or may be implemented as multi components (e.g., multi chips). The wireless communication module 192 may identify and authenticate the electronic device 101 within a communication network, such as the first network 198 or the second network 199, using subscriber information (e.g., international mobile subscriber identity (IMSI)) stored in the subscriber identity module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 connected to the second network 199. Each of the electronic devices 102 and 104 may be a device of the same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or the service requested, or an additional function or an additional service related to the request, and may transfer an outcome of the performing to the electronic device 101. The electronic device 101 may provide outcome, with or without further processing of the outcome, as at least part of a reply to the request. To this end, a cloud-computing, a distributed-computing, or a client-server-computing technologies may be used, for example.

The electronic device according to an embodiment may be one of various types of electronic devices. The electronic device may include, for example, a portable communication device (e.g., smartphone), a computer device, a portable multimedia device, a portable medical device, a camera, a wearable device, and a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item include one or more of the things, unless the relevant context clearly indicates otherwise. As used herein, each of such phrases as "A or B", "at least one of A and B", "at least one of A or B", "A, B, or C," "at least one of A, B, and C," and "at least one of A, B, or C," may include all possible combinations of the items enumerated together in a corresponding one of the phrases. As used herein, such terms as "1st", "2nd", "a first", "a second", "the first", or "the second" may be to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element. As used herein, the term "module" may include a unit implemented in hardware, software, or firmware, and may interchangeably be used with other terms, for example, "logic", "logical block", "component", "part", "circuitry", etc. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated or executed by a compiler or a code executable by an interpreter. The machine-readable storage medium may be provided in the form of a non-transitory storage medium. While the term "non-transitory" simply means that the storage medium is a tangible device, and does not include a signal (e.g., an electromagnetic wave), this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)) or be distributed (e.g., downloaded or uploaded) online via an application store (e.g., Play Store™), or between two user devices (e.g., smart phones) directly. If distributed online, at least a part of the computer program product may be temporarily generated or at least temporarily stored in the machine-readable storage medium, such as a memory of a manufacturer's server, a server of the application store, or a relay server.

According to an embodiment, each component (e.g., a module or a program) of the above-described components may include a single entity or multiple entities.

According to various embodiments, one of more of the above-described components may be omitted, or one or more other components may be added.

Alternatively or additionally, a plurality of components (e.g., modules or a programs) may be integrated into a single component. In such a case, according to various embodiments, the integrated component may still perform one or more functions of each of the plurality of components in the same or similar manner as they are performed by corresponding one of the plurality of components before the integration.

According to various embodiments, operations performed by the module, the program, or another component may be carried out sequentially, in parallel, repeatedly, or heuristically, or one or more operations may be executed in a different order or may be omitted, or other operations may be added.

Figure 2:
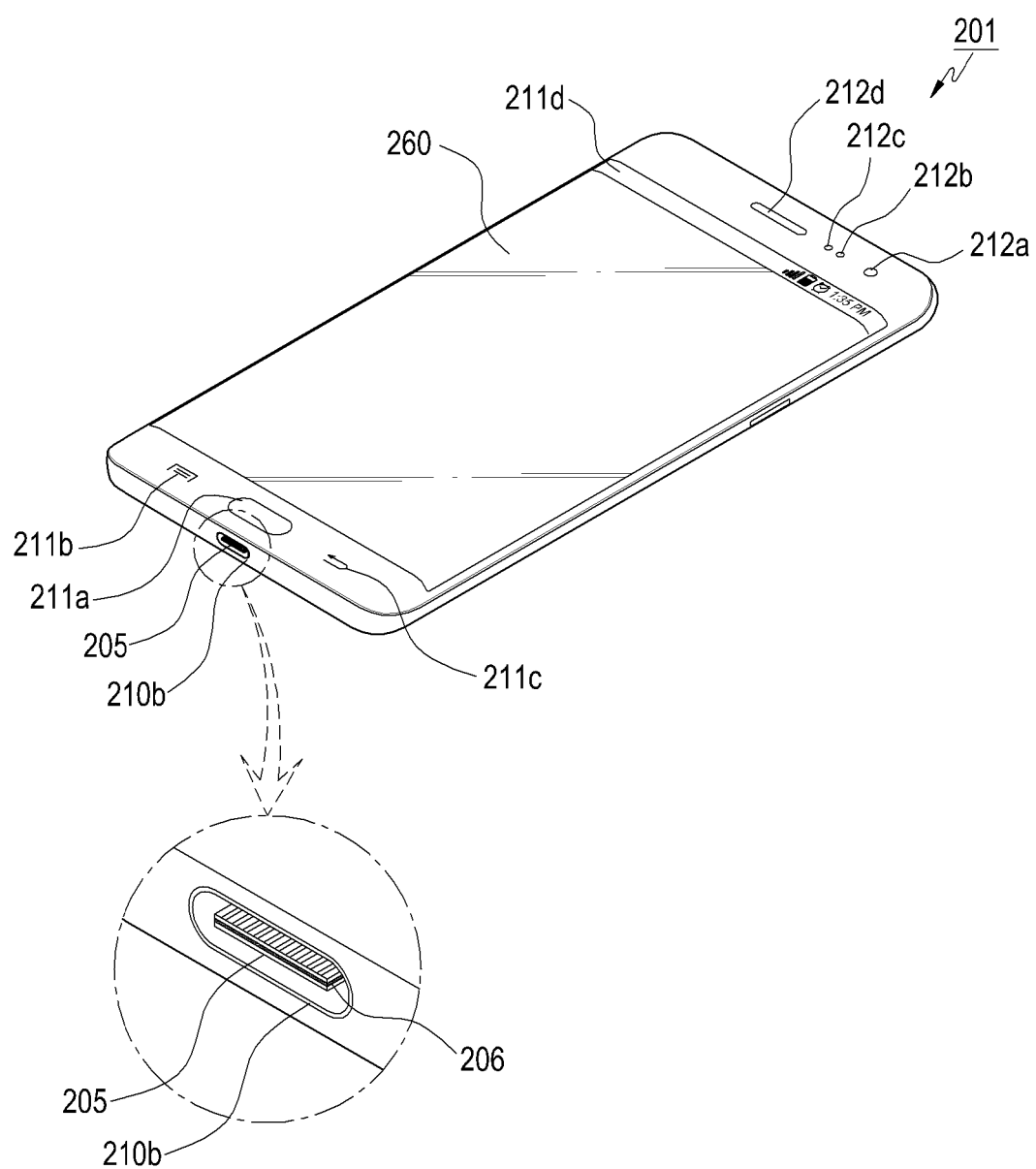
FIG. 2 is a perspective view illustrating the front of an electronic device, according to an embodiment.

FIG. 2 is a perspective view illustrating the front of an electronic device 201 according to an embodiment. The electronic device 201 may include a part or the entirety of the electronic device 101.

Referring to FIG. 2, the electronic device 201 may be a smartphone, a wearable device, a television (TV), or a tablet personal computer (PC) that includes an connector 210b (e.g., a USB type-C connector) for connecting to an external electronic device (e.g., the electronic device 102 or the electronic device 104). The connector 210b of the electronic device 201 may be termed a receptacle, and a connector of another electronic device that can be fastened onto the receptacle may be termed a plug.

A display 260 capable of sensing a touch and a user hovering over the display 260 may be disposed in the center of the front of the electronic device 201. The display 260 may occupy most of the front of the electronic device 201.

FIG. 2 illustrates displaying a main home screen on the display 260. The main home screen is the screen that is displayed first on the display 260 when the electronic device 201 is powered on. When the electronic device 201 has a plurality of different home screens, the main home screen may be the first home screen among the plurality of home screens. The main home screen may display shortcut icons for executing frequently used applications, a main menu switch key, time, weather, etc. The main menu switch key may display a menu screen on the display 260. Further, a status bar 211d is provided on an upper portion of the display 260 to display a state, such as a battery charge state, received signal strength, and the current time. A home key 211a, a menu button 211b, and a back button 211c are provided on the lower portion of the display 260.

The home key 211a may be used to display the main home screen on the display 260. For example, when the home button 211a is touched while the menu screen or any home screen other than the main home screen is displayed on the display 260, the main home screen may be displayed on the display 260. Further, when the home key 211a is touched while applications are being executed on the display 260, the main home screen may be displayed on the display 260. The home key 211a may also be used to display recently used applications on the display 260 or to display a task manager.

The menu button 211b may provide a link menu that may be used on the display 260. The link menu may include a widget add menu, a background screen change menu, a search menu, an edit menu, a configuration menu, etc. The back button 211c may be used to display the screen that was executed just before the currently executed screen, or may terminate the most recently used application.

According to an embodiments, a first camera 212a, an illumination sensor 212b, a proximity sensor 212c, and a speaker 212d are included in an upper portion of the front of the electronic device 201. The electronic device 201 includes a connector 210b that can be electrically connected to an external electronic device 102 or 104. The connector 210b may be used as an interface for connecting the electronic device 201 to the external electronic device 102 or 104, or a power source. The electronic device 201 may transmit data stored in a memory of the electronic device 201 to the external electronic device 102 or 104, or may receive data from the external electronic device 102 or 104 through a cable connected to the connector 210b under the control of a processor 120. Further, the electronic device 201 may receive power (e.g., a voltage or a current) from the power source through a cable connected to the connector 210b or may charge a battery using the power source. The connector 210b may be a USB type-C connector, and may have a contact substrate 205 formed therein. A mid plate 206 having the characteristics of an electrical conductor is formed inside the contact substrate 205. A plurality of pins are formed on the upper surface and/or the lower surface of the contact substrate 205. The electronic device 201 may be connected to the external electronic device 102 or 104 via the connector 210b in a wired manner. In this case, the connector 210b may be formed such that pins of the external electronic device 102 or 104 can be installed thereon either in a regular orientation or in the reverse orientation. Accordingly, the pins of the external electronic device 102 or 104 may be put in the connector 210b in either orientation. The plurality of pins formed on the upper surface and the lower surface of the contact substrate 205 may be arranged to enable data transmission/reception or power transmission/reception regardless of the orientation in which the terminals of the external electronic device 102 or 104 are put in the connector 210b.

Figure 3:
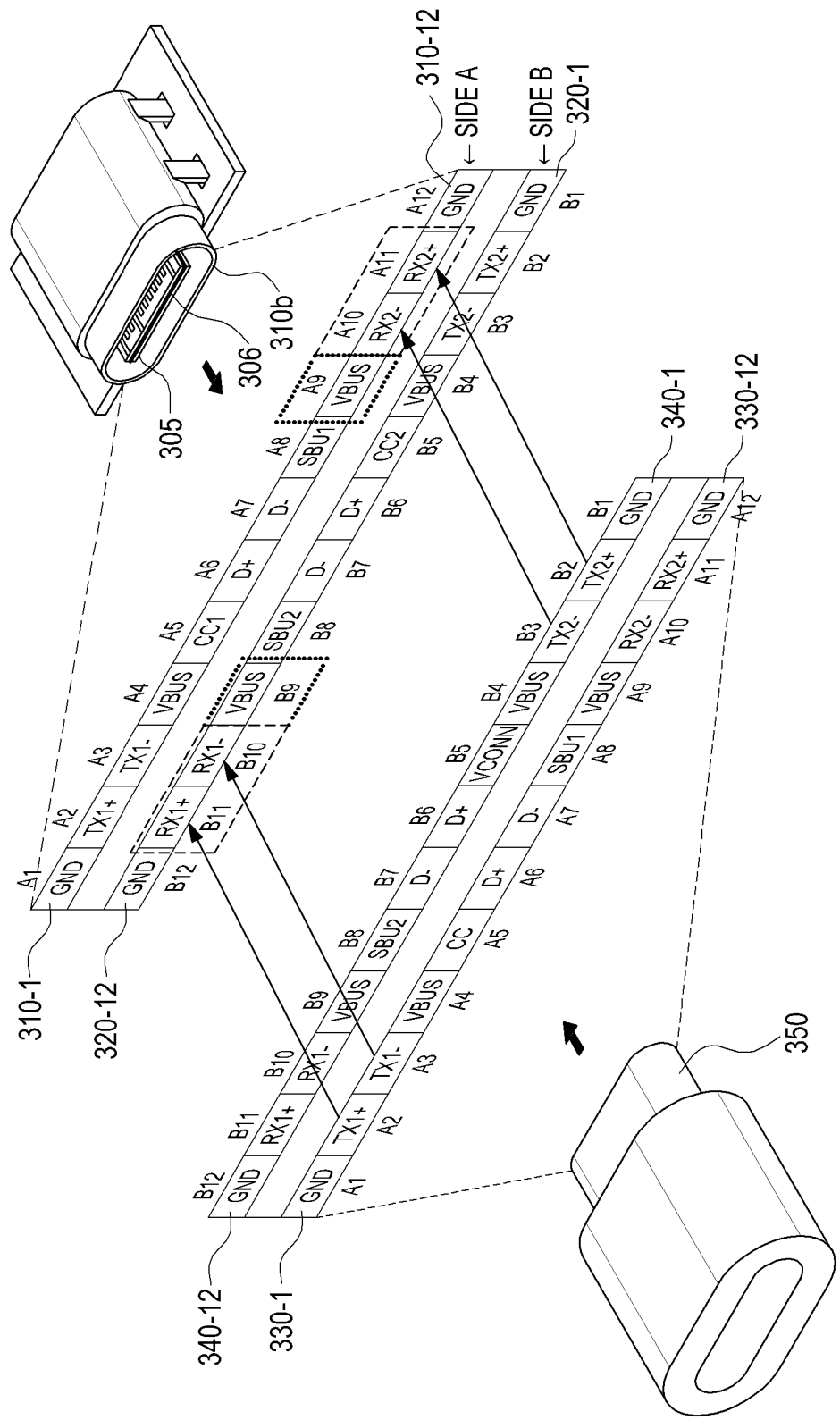
FIG. 3 illustrates functions of a plurality of pins formed on contact substrates of a connector of an electronic device and a connector of an external electronic device, according to an embodiment.

FIG. 3 illustrates functions of a plurality of pins formed on contact substrates of a connector of an electronic device and a connector of an external electronic device according to an embodiment.

Referring to FIG. 3, the electronic device (e.g., the electronic device 201) may be electrically connected to the external electronic device (e.g., the electronic device 102 or the electronic device 104) via a connector 310b. The connector 310b of the electronic device may be formed such that a connector 350 of the external electronic device may be put therein in any orientation of a regular orientation and the reverse orientation, and a contact substrate 305 may be formed inside the connector 310b. The contact substrate 305 has 12 pins 310-1, 310-2, . . . , and 310-12 formed on a first side (e.g., side A) corresponding to the regular orientation and has 12 pins 320-1, 320-2, . . . , and 320-12 formed on a second side (e.g., side B) corresponding to the reverse orientation. A mid plate 306 having the characteristics of an electrical conductor is formed inside the contact substrate 305. The connector 350 of the external electronic device is formed with 12 pins 330-1, 330-2, . . . , and 330-12 on a first side (e.g., side A) to come into contact with the 12 pins 310-1, 310-2, . . . , and 310-12 formed on the first side (e.g., side A) of the contact substrate 305, and is formed with 12 pins 340-1, 340-2, . . . , and 340-12 on a second side (e.g., side B) to come into contact with the 12 pins 320-1, 320-2, . . . , and 320-12 formed on the second side (e.g., side B) of the contact substrate 305. The number of pins formed on the connector 350 of the external electronic device may vary depending on the type of the external electronic device. Also, the number of configuration channel (CC) pins of the external electronic device may be one or two depending on the type. For example, the 12 pins formed on the first side (e.g., side A) may be arranged in the same order as the 12 pins formed on the second side (e.g., side B), so that the connector 350 of the external electronic device can be put in either the first side or the second side. This structure enables the user to put a cable of the external electronic device, which is rotated by 180 degrees, into the connector 310b of the electronic device 201.

According to an embodiment, the pins formed on the first side (e.g., side A) and the second side (e.g., side B) of the contact substrate 305 may be arranged as illustrated in Table 1.

TABLE 1

| Pin No. | Pin No. | Signal Name | Function | Note |
|---|---|---|---|---|
| A1 | B1 | GND | Power | Ground (e.g. Support for 60 W minimum (combined with all $V_{BUS}$ pins)) |
| A2 | B2 | TX1+, TX2+, or SSTXp1 | USB 3.1 or Alternate Mode | Super speed TX positive (e.g., 10 Gb/s differential pair with TX1−) |
| A3 | B3 | TX1−, TX2−, or SSTXn1 | USB 3.1 or Alternate Mode | Supper speed TX negative (e.g. 10 Gb/s differential pair with TX1+) |
| A4 | B4 | $V_{BUS}$ | Power | USB cable charge power (e.g., Support for 60 W minimum (combined with all $V_{BUS}$ pins)) |
| A5 | B5 | CC1 or CC2 | CC or VCONN | Identification terminal |
| A6 | B6 | D+ | USB 2.0 | +line of the differential bi-directional USB signal |
| A7 | B7 | D− | USB 2.0 | −line of the differential bi-directional USB signal |
| A8 | B8 | SBU1 or SBU2 | Alternate Mode | Side band Use: additional purpose pin (e.g., Audio signal, display signal, etc.) |
| A9 | B9 | $V_{BUS}$ | Power | USB cable charge power (e.g., Support for 60 W minimum (combined with all $V_{BUS}$ pins) |
| A10 | B10 | RX1−, RX2−, or SSRXn2 | USB 3.1 or Alternate Mode | Super speed RX negative (e.g., 10 Gb/s differential pair with RX2+) |
| A11 | B11 | RX1+, RX2+, or SSRXp2 | USB 3.1 or Alternate Mode | Super speed RX negative (e.g., 10 Gb/s differential pair with RX2−) |
| A12 | B12 | GND | Power | Ground (e.g., Support for 60 W minimum (combined with all $V_{BUS}$ pins)) |

Table 1 illustrates the pins of the USB type-C connector 310b according to an embodiment. The USB type-C connector 310b includes 12 pins (or terminals) on each of the first side (e.g., side A) and the second side (e.g., side B). The 12 pins on the first side (e.g., side A) may include a ground (GND) pin (A1), a super speed TX+(TX1+) pin (A2), a super speed TX− (TX1−) pin (A3), a VBUS pin (A4), a CC1 pin (A5), a bi-directional USB signal+ (D+) pin (A6), a bi-directional USB signal− (D−) pin (A7), a side band use (SBU1) pin (A8), a $V_{BUS}$ pin (A9), a super speed RX− (RX2−) pin (A10), a super speed RX+ (RX2+) pin (A11), and a GND pin (A12). The 12 pins on the second side (e.g., side B) may include a GND pin (B1), a TX2+ pin (B2), a TX2− pin (B3), a VBUS pin (B4), a CC2 pin (or $V_{CONN}$ pin (B5)), a D+ pin (B6), a D− pin (B7), an SBU2 pin (B8), a VBUS pin (B9), an RX1− pin (B10), an RX1+ pin (B11), and a GND pin (B12).

Due to the reversibility of the USB type-C connector 310b, the 24 pins formed on the first and second sides may be arranged in a mirrored configuration. This structure enables the user to put the connector 350 of the external electronic device, which is rotated by 180 degrees, into the connector 310b of the electronic device. In this case, symmetrical pins may not be used at the same time. For example, when the TX1+ pin and the TX1− pin are used, the TX2+ pin, the TX2− pin, the RX2+ pin, and the RX2− pin may not be used. When the RX1+ pin and the RX1− pin are used, the RX2+ pin, the RX2-pin, the TX1+ pin, and the TX1− pin may not be used. The mid plate 306, having electrically conductive characteristics, may be included inside the contact substrate 305 of the connector 310b. Although there are a total of 24 pins (e.g., 12 pins on the first side and 12 pins on the second side) on the contact substrate 305, the pins may not be used at the same time. The pin to be used may be determined depending on the connecting cable, the connector attached to the end of the cable, and the connection state of the connector 305 of the electronic device 201 connected to the connector.

The CC1 pin 310-5 formed on the first side (e.g., side A) of the contact substrate 305 and the CC2 pin 320-5 formed on the second side (e.g., side B) may be used to identify the external electronic device connected to the connector 310b. For example, when the connector 350 of the external electronic device is put into the connector 310b of the electronic device with the first side (e.g., side A) of the connector 350 facing upwards so that the CC1 pin 310-5 of the electronic device is connected to a CC pin 330-5 of the external electronic device, the CC2 pin 320-5 of the electronic device 201 may be used to supply power (e.g., $V_{CONN}$) for an integrated circuit (IC) to recognize the external electronic device. When the connector 350 of the external electronic device is put into the connector 310b of the electronic device with the first side (e.g., side A) of the connector 350 facing downwards so that the CC2 pin 320-5 of the electronic device 201 is connected to the CC pin 330-5 of the external electronic device, the CC1 pin 310-5 of the electronic device 201 may be used to supply power (e.g., $V_{CONN}$) for the IC to recognize the external electronic device. The CC pins 310-5 and 320-5 of the electronic device 201 may be connected to a CC or $V_{CONN}$ pin of the external electronic device, and may support CC and $V_{CONN}$.

According to an embodiment, the SBU1 pin 310-8 and the SBU2 pin 320-8 of the electronic device are low-speed signal pins assigned for use in an alternative mode. Prior to power transmission/reception, negotiations on the alternative mode may be required between the electronic device and the external electronic device.

According to an embodiment, when the electronic device receives data from the external electronic device connected to the connector 310b, the $V_{BUS}$ pin (A4) the RX2− pin (A10), the RX2+ pin (A11) and the GND pins (A1 and A12) on the first side (e.g., side A) may be connected to a $V_{BUS}$ pin (A9), a TX1− pin (A3), a TX1+ pin (A2), and GND pins (A1 and A12) on the first side (e.g., side A) of the connector 350 of the external electronic device, or may be connected to a $V_{BUS}$ pin (B9), a TX2− pin (B3), a TX2+ pin (B2), and GND pins (B1 and B12) on the second side (e.g., side B).

Figure 4:
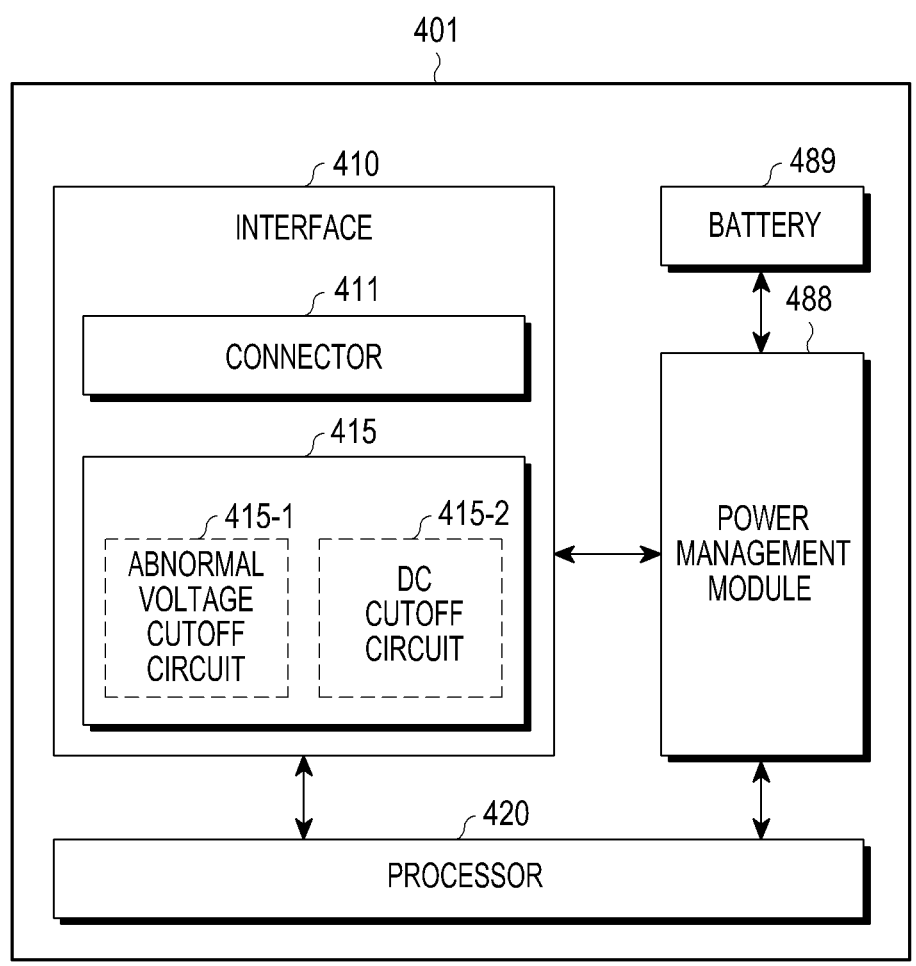
FIG. 4 is a block diagram of an electronic device, according to an embodiment.

FIG. 4 is a block diagram of an electronic device according to an embodiment.

Referring to FIG. 4, the electronic device 401 includes an interface 410, a processor 420, a power management module 488, and a battery 489. FIG. 4 illustrates only components associated with an embodiment of the present disclosure, but other components may also be included, in addition to the components. For example, the electronic device 401 may include a part or the entirety of the electronic device 101, the electronic device 201, and/or the connector 310b.

The interface 410 may include a part or the entirety of the interface 177 or the connection terminal 178. According to an embodiment, the interface 410 includes a connector 411 and a protection circuit 415 connected to the connector 411 and the processor 420 to protect an internal circuit of the electronic device 401.

The connector 411 may be electrically connected to the external electronic device (e.g., the electronic device 102 or the electronic device 104) and may include a part or the entirety of the connector 210b or the connector 310b. The connector 411 may include a plurality of pins (e.g., 310-1 to 12 or 320-1 to 12). According to an embodiment, the connector 411 may be a USB type-C connector.

The protection circuit 415 is for protecting internal circuits of the connector 411 or the electronic device 401 connected to the connector 411 from abnormal voltage (e.g., surge voltage or leakage voltage) or an electric current that may be applied or introduced to at least some of the plurality of pins of the connector 411, and may include an abnormal voltage cutoff circuit 415-1 or a direct current (DC) cutoff circuit 415-2.

The abnormal voltage cutoff circuit 415-1 may be connected to one or more first data reception pins (e.g., 310-10 and 310-11, or 320-10 and 320-11), which receive data (e.g., first data) from the external electronic device connected via the connector 411, among the plurality of pins 310-1 to 12 or 320-1 to 12 of the connector 411, and to data reception terminals of the processor 420 connected respectively to the one or more first data reception pins 310-10 and 310-11 or 320-10 and 320-11.

According to an embodiment, the first data reception pins 310-10 and 310-11, or 320-10 and 320-11 may include a super speed RX negative (SSRXn) pin (or RX− pin) 310-10 or 320-10, or a super speed RX positive (SSRXp) pin (or RX+ pin) 310-11 or 320-11.

According to an embodiment, when the first data reception pins 310-10 and 310-11 or 320-10 and 320-11 among the plurality of pins 310-1 to 12 or 320-1 to 12 of the connector 411 are connected to the external electronic device, an abnormal voltage (e.g., surge voltage or leakage voltage) or an electric current that may be introduced into the first data reception pins 310-10 and 310-11 or 320-10 and 320-11 may be blocked or dropped by the abnormal voltage cutoff circuit 415-1. For example, when the connector 411 is USB type-C, the first data reception pins 310-10 and 310-11 or 320-10 and 320-11 may be disposed adjacent to at least some of one or more power supply pins (e.g., $V_{BUS}$ pins 310-9 or 320-9) to which power is applied.

At least some of the one or more $V_{BUS}$ pins 310-9 or 320-9 may be supplied with different levels of power, for example, 5 V, 9 V, 15 V, or 20 V. When data (e.g., first data) is received from the external electronic device via the first data reception pins 310-10 and 310-11 or 320-10 and 320-11, power applied to the $V_{BUS}$ pins 310-9 or 320-9 may be introduced into the one or more first data reception pins 310-10 and 310-11 or 320-10 and 320-11 disposed adjacent to at least some of the one or more $V_{BUS}$ pins 310-9 or 320-9, or at least some of the one or more $V_{BUS}$ pins 310-9 or 320-9 and the one or more first data reception pins 310-10 and 310-11 or 320-10 and 320-11 may be short-circuited by foreign substances or the like.

According to an embodiment, the abnormal voltage cutoff circuit 415-1 may include one or more first receiver capacitors connected in series to the first data reception pins 310-10 and 310-11 or 320-10 and 320-11 and to the data reception terminals of the processor 420, respectively, corresponding to the first data reception pins 310-10 and 310-11 or 320-10 and 320-11. For example, each first receiver capacitor may be an AC coupling capacitor that blocks a DC component from abnormal voltage (e.g., $V_{BUS}$ power (e.g., a surge voltage of 20 V or higher) or leakage voltage leaking from the $V_{BUS}$ power) introduced through each of the first data reception pins 310-10 and 310-11 or 320-10 and 320-11 and passes an AC component. According to an embodiment, each first receiver capacitor may be about 75 nF to 265 nF or higher, as defined in the USB standard. According to an embodiment, based on the USB standard, each first receiver capacitor may have optimal performance at about 330 nF. According to an embodiment, each first receiver capacitor may be between about 220 nF and 1000 nF. The abnormal voltage cutoff circuit 415-1 is not limited to this, and may include various components. A DC cutoff circuit 415-2 may be disposed between one or more first data transmission pins (e.g., 310-2 and 310-3 or 320-2 and 320-3), which transmit data (e.g., second data) to the external electronic device connected via the connector 411, among the plurality of pins 310-1 to 12 or 320-1 to 12 of the connector 411, and to data transmission terminals of the processor 420 connected respectively corresponding to the one or more first data transmission pins 310-2 and 310-3 or 320-2 and 320-3. According to an embodiment, the first data transmission pins may include an SSTXp pin (or TX+ pin) 310-2 or 320-2 or an SSTXn pin (or TX− pin) 310-3 or 320-3.

According to an embodiment, when the one or more first data transmission pins 310-2 and 310-3 or 320-2 and 320-3 among the plurality of pins 310-1 to 12 or 320-1 to 12 of the connector 411 are connected to the external electronic device, abnormal voltage (e.g., surge voltage or leakage voltage) or a DC component (e.g., DC voltage or DC current) of an electric current that may be introduced into the one or more first data transmission pins 310-2 and 310-3 or 320-2 and 320-3 may be blocked by the DC cutoff circuit 415-2.

For example, when the connector 411 is a USB type-C, the one or more first data transmission pins 310-2 and 310-3 or 320-2 and 320-3 may be disposed adjacent to one or more power supply pins (e.g., $V_{BUS}$ pins 310-4 or 320-4) to which power is applied. At least some of the one or more $V_{BUS}$ pins 310-4 or 320-4 may be supplied with different levels of power, for example, 5 V, 9 V, 15 V or 20 V. When data (e.g., second data) is transmitted to the external electronic device via the first data transmission pins 310-2 and 310-3 or 320-2 and 320-3, power voltage (e.g., a surge $V_{BUS}$ voltage of 20 V or higher) applied to some of the one or more $V_{BUS}$ pins 310-4 or 320-4 or leakage voltage or an electric current leaking from the power voltage may be introduced into the one or more first data transmission pins 310-2 and 310-3 or 320-2 and 320-3 disposed adjacent to at least some of the one or more $V_{BUS}$ pins 310-4 or 320-4, or at least some of the one or more $V_{BUS}$ pins 310-4 or 320-4 and the one or more first data transmission pins 310-2 and 310-3 or 320-2 and 320-3 may be short-circuited by foreign substances or the like.

According to an embodiment, the DC cutoff circuit 415-2 may include one or more first transmitter capacitors connected in series to the first data transmission pins 310-2 and 310-3 or 320-2 and 320-3 and to the data transmission terminals of the processor 420, respectively, corresponding to the first data transmission pins 310-2 and 310-3 or 320-2 and 320-3. For example, each first transmitter capacitor may be an AC coupling capacitor that blocks a DC component from abnormal voltage (e.g., $V_{BUS}$ power (e.g., a surge voltage of 20 V or higher) or leakage voltage leaking from the $V_{BUS}$ power) or an electric current introduced through each of the first data transmission pins 310-2 and 310-3 or 320-2 and 320-3 and passes an AC component. According to an embodiment, each first transmitter capacitor may have a value of about 75 nF to 265 nF, as defined in the USB standard.

The processor 420 may include a part or the entirety of the processor 120, and may control the overall operation of the electronic device 401. The processor 420 may detect the connection of the external electronic device to the connector 411. According to an embodiment, the processor 420 may detect whether the external electronic device is connected to the electronic device 401 via the connector 411 using a time constant (e.g., RC delay time). For example, when the external electronic device is connected through the connector 411, the time constant (e.g., RC delay time) may be about 600 µs to 750 µs. When the external electronic device is not connected to or disconnected from the connector 411, the time constant (e.g., RC delay time) may be about 0.1 µs. Based on this, the processor 420 may set a first threshold value of the time constant to about 0.1 µs and may set a second threshold value of the time constant to about 600 µs to 750 µs. The first and second threshold values are merely examples, and may be set differently.

The processor 420 may detect whether the external electronic device is connected to or disconnected from the connector 411 based at least partly on the time constant (e.g., RC delay time). For example, the processor 420 may detect that the external electronic device is not connected to or disconnected from the connector 411 when the time constant is less than the first threshold value. The processor 420 may detect that the external electronic device is connected via the connector 411 when the time constant is equal to or greater than the second threshold value.

According to an embodiment, the time constant may be formed by the first transmitter capacitors, connected to the first data transmission pins 310-2 and 310-3 or 320-2 and 320-3 of the connector 411 of the electronic device 401 and to the data transmission terminals of the processor 420; a second receiver capacitor connected to second data reception pins 330-10 and 330-11 or 340-10 and 340-11 of the connector 350 of the external electronic device 102 or 104 electrically connected to the first data transmission pins 310-2 and 310-3 or 320-2 and 320-3 and to a data reception terminal of a processor of the external electronic device; and a resistor, connected to the second data reception pins 330-10 and 330-11 or 340-10 and 340-11 and to a ground of the external electronic device. According to an embodiment, the value of the second receiver capacitor of the external electronic device may be greater than the value of the first transmitter capacitors of the electronic device 401.

The processor 420 may transmit data to or receive data from the external electronic device, or may transmit power to or receive power from the external electronic device when it is detected that the external electronic device is connected to the connector 411.

According to an embodiment, the processor 420 may transmit data to or receive data from the external electronic device through the one or more first data reception pins 310-10 and 310-11 or 320-10 and 320-11, which receive data (e.g., first data) from the external electronic device among the plurality of pins 310-1 to 12 or 320-1 to 12 of the connector 411, and the one or more first data transmission pins 310-2 and 310-3 or 320-2 and 320-3, which transmit data (e.g., second data) to the external electronic device. In data reception, the processor 420 may enable the one or more first data reception pins 310-10 and 310-11 or 320-10 and 320-11 to be connected to the external electronic device. For example, the enabled first data reception pins 310-10 and 310-11 or 320-10 and 320-11 may be connected to the second data transmission pins (e.g., 330-2 and 330-3 or 340-2 and 340-3) among a plurality of pins of the connector 350 of the external electronic device.

According to an embodiment, the processor 420 may transmit power to or receive power from the external electronic device through power supply pins (e.g., $V_{BUS}$ pins 310-4 and 310-9 or 320-4 and 320-9) that receive power from or supply power to the external electronic device among the plurality of pins 310-1 to 12 or 320-1 to 12 of the connector 411. According to an embodiment, when the electronic device 401 is a host, the processor 420 may supply power to the external electronic device through at least some of the one or more $V_{BUS}$ pins 310-4 and 310-9 or 320-4 and 320-9. When the electronic device 401 is not a host, the processor 420 may be supplied with power from the external electronic device through at least some of the one or more $V_{BUS}$ pins 310-4 and 310-9 or 320-4 and 320-9.

The processor 420 may enable at least one of the data transmission and reception pins or the power supply pins to transmit or receive data, to transmit or receive power, or to transmit or receive data and power at the same time.

The power management module 488 may include a part or the entirety of the power management module 188. The power management module 488 may manage the power of the electronic device 401. According to an embodiment, the power management module 488 may include a PMIC, a charger IC, or a battery gauge. The PMIC may support wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, e.g., the remaining battery charge, the charging voltage, the current, or temperature of the battery 489. The battery 489 may include, for example, a rechargeable battery and/or a solar battery.

The power management module 488 may supply power to the battery 489 of the electronic device 401 under the control of the processor 420. Further, the power management module 488 may supply, to the electronic device 401, power input from an external power source through the connector 411 of the interface 410. In addition, the power management module 488 may supply, to the electronic device 401, wireless power from an external power source through a wireless charging technique. The power management module 488 may include a CC block connected to a CC pin (e.g., 310-5 or 320-5) of the connector 411 (e.g., USB type-C) of the interface 410; and an analog-to-digital converter (ADC) connected to the $V_{BUS}$ pins 310-4 and 310-9 or 320-4 and 320-9 and the GND pins (e.g., 310-1 and 310-12 or 320-1 and 320-12).

FIGS. 5A to 5E are block diagrams illustrating an electronic device connected to an external electronic device via a connector according to an embodiment. The electronic device 501 may include a part or the entirety of the electronic device 101, the electronic device 201, the connector 310b, or the electronic device 401. The external electronic device 505 may include a part or the entirety of the electronic device 102 or 104 or the connector 350. Abnormal voltage cutoff circuits 515-1a to 515-1e of the electronic device 501 are embodiments of the abnormal voltage cutoff circuit 415-1, and a detailed description of the same components is omitted herein. A connector 511 (e.g., the connector 310b or the connector 411) of the electronic device 501 and a connector 550 (e.g., the connector 350) of the external electronic device 505 have the same structure such that they can be connected together.

Referring to FIGS. 5A to 5E, the connector 511 of the electronic device 501 may be electrically connected with the connector 550 of the external electronic device 505 via a cable (e.g., a USB cable). The electronic device 501 may transmit data to or receive data from the external electronic device 505 through data transmission pins (e.g., 310-2 and 310-3 or 320-2 and 320-3) or data reception pins (e.g., 310-10 and 310-11 or 320-10 and 320-11) among a plurality of pins (e.g., 310-1 to 12 or 320-1 to 12) of the connector 511. For example, when the electronic device 501 receives data from the external electronic device 505, the data reception pins 310-10 and 310-11 or 320-10 and 320-11 of the connector 511 of the electronic device 501 may be connected to data transmission pins (e.g., 330-2 and 330-3 or 340-2 and 340-3) of the connector 550 of the external electronic device 505. Conversely, when the electronic device 501 transmits data to the external electronic device 505, the data transmission pins 310-2 and 310-3 or 320-2 and 320-3 of the connector 511 of the electronic device 501 may be connected to data reception pins (e.g., 330-10 and 330-11 or 340-10 and 340-11) of the connector 550 of the external electronic device 505.

According to an embodiment, the connector 511 of the electronic device 501 may be connected to a processor 520. For example, the plurality of pins 310-1 to 12 or 320-1 to 12 of the connector 511 of the electronic device 501 may be connected to a plurality of corresponding terminals of the processor 520.

FIGS. 5A to 5E illustrates only terminals (e.g., $P_{TX1}$ and $P_{TX2}$ or $P_{RX1}$ and $P_{RX2}$) of the processors 520 corresponding to the data transmission and reception pins among the plurality of pins 310-1 to 12 or 320-1 to 12 of the connector 511 of the electronic device 501. Similarly, the connector 550 of the external electronic device 505 may be connected to a processor 530. For example, a plurality of pins 330-1 to 12 or 340-1 to 12 of the connector 550 of the external electronic device 505 may be connected to a plurality of corresponding terminals of the processor 530.

FIGS. 5A to 5E illustrate only terminals (e.g., $P_{TX1}$ and $P_{TX2}$, or $P_{RX1}$ and $P_{RX2}$) of the processors 530 corresponding to the data transmission and reception pins among the plurality of pins 330-1 to 12 or 340-1 to 12 of the connector 550 of the external electronic device 505.

According to an embodiment, a protection circuit 515 may be connected to the connector 511 and the processor 520 of the electronic device 501. For example, the protection circuit 515 may include an abnormal voltage cutoff circuit 515-1a to 515-1e and a DC cutoff circuit 515-2. The abnormal voltage cutoff circuit 515-1a to 515-1e may be configured in different ways. The external electronic device 505 may include transmitter capacitors (e.g., second transmitter capacitors $C_{TX21}$ or $C_{TX22}$) connected in series to the second data transmission pins 330-2 and 330-3, or 340-2 and 340-3 of the connector 550 and to the data transmission terminals $P_{TX1}$ or $P_{TX2}$ of the processor 530. According to an embodiment, the external electronic device 505 may further include receiver capacitors (e.g., second receiver capacitors $C_{RX21}$ or $C_{RX22}$) connected in series to the second data reception pins 330-10 and 330-11 or 340-10 and 340-11 of the connector 550 and to the data reception terminals $P_{RX1}$ or $P_{RX2}$ of the processor 530, or resistors (e.g., parallel resistors $R_{RX21}$ or $R_{RX22}$) connected to the receiver capacitors $C_{RX21}$ or $C_{RX22}$ and to a ground of the external electronic device 505.

Figure 5A:
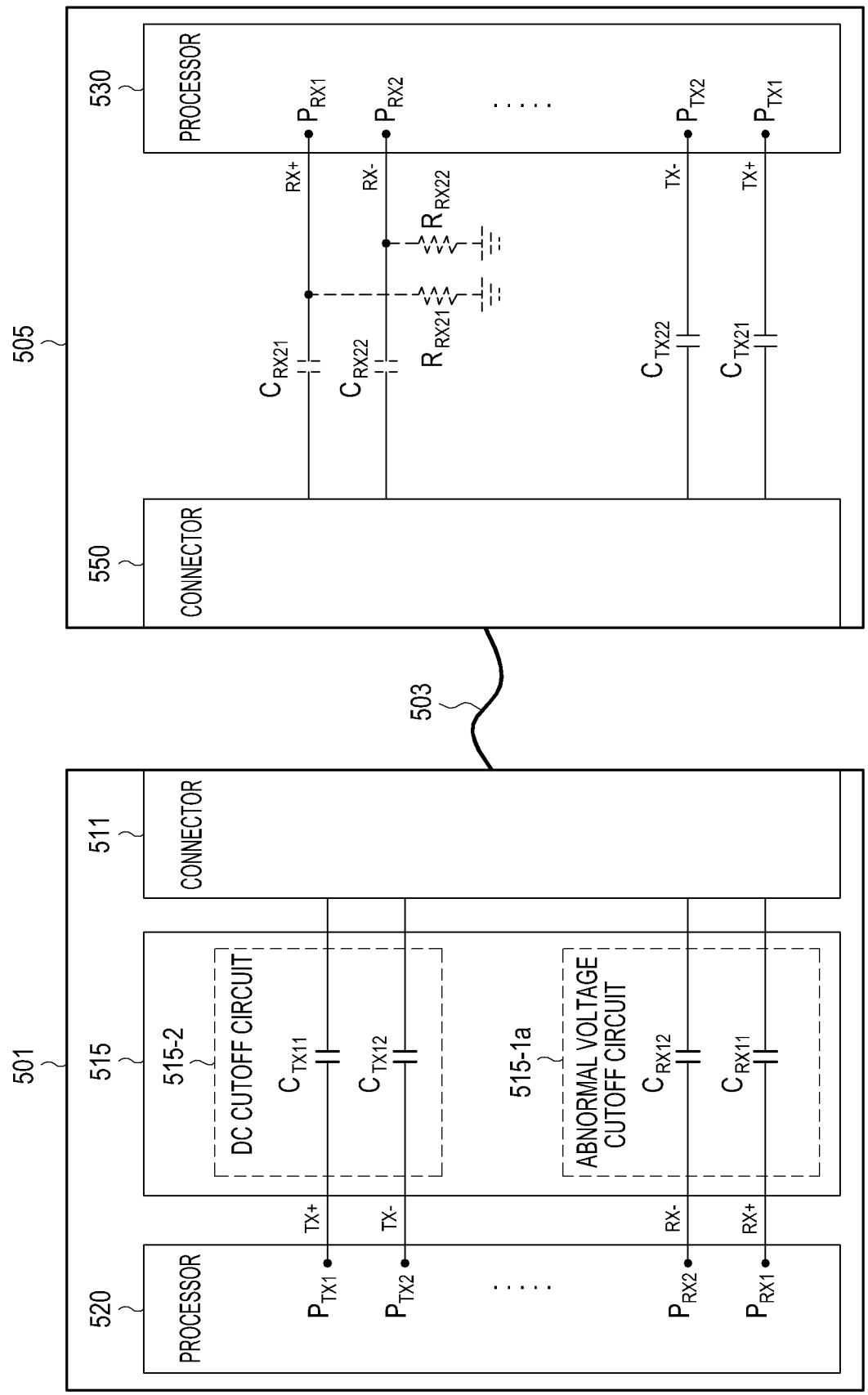
FIGS. 5A to 5E are block diagrams illustrating an electronic device connected to an external electronic device via a connector, according to an embodiment.

Referring to FIG. 5A, the abnormal voltage cutoff circuit 515-1a of the electronic device 501 may be connected to first data reception pins (e.g., 310-10 and 310-11 or 320-10 and 320-11), which receive data (e.g., first data) from the external electronic device 505 connected via the connector 511, among the plurality of pins (e.g., 310-1 to 12 or 320-1 to 12) of the connector 511 and to data reception terminals $P_{RX1}$ or $P_{RX2}$ of the processor 520 connected respectively to the first data reception pins 310-10 and 310-11 or 320-10 and 320-11.

According to an embodiment, the connector 511 may be a USB type-C connector. The first data reception pins 310-10 and 310-11 or 320-10 and 320-11 may include an SSRXn pin (or RX− pin) 310-10 or 320-10 or an SSRXp pin (or RX+ pin) 310-11 or 320-11.

According to an embodiment, the abnormal voltage cutoff circuit 515-1a may include one or more first receiver capacitors (e.g., $C_{RX11}$ or $C_{RX12}$) connected in series to the first data reception pins 310-10 and 310-11, or 320-10 and 320-11 and to the data reception terminals $P_{RX1}$ or $P_{RX2}$ of the processor 520 corresponding to the first data reception pins 310-10 and 310-11, or 320-10 and 320-11. For example, the abnormal voltage cutoff circuit 515-1a may include a first receiver capacitor $C_{RX11}$ connected in series to a first data reception pin (e.g., SSRXp pin (or RX+ pin)) 310-11 or 320-11 and to a data reception terminal $P_{RX1}$ of the processor 520, and a first receiver capacitor $C_{RX12}$ connected in series to a first data reception pin (e.g., SSRXn pin (or RX− pin)) 310-10 or 320-10 and to a data reception terminal $P_{RX2}$ of the processor 520.

According to an embodiment, each of the first receiver capacitors $C_{RX11}$ or $C_{RX12}$ of the electronic device 501 may be an AC coupling capacitor that blocks a DC component from abnormal voltage (e.g., $V_{BUS}$ power (i.e. a surge voltage of 20 V or higher) or leakage voltage leaking from the $V_{BUS}$ power) or an electric current introduced through the corresponding first data reception pins 310-10 and 310-11, or 320-10 and 320-11, and passes an AC component.

According to an embodiment, when the electronic device 501 receives data from the external electronic device 505, the data reception pins 310-10 and 310-11, or 320-10 and 320-11 of the connector 511 of the electronic device 501 may be connected to the data transmission pins (e.g., 330-2 and 330-3, or 340-2 and 340-3) of the connector 550 of the external electronic device 505. Accordingly, the first receiver capacitors $C_{RX11}$ or $C_{RX12}$ connected in series to the data reception pins 310-10 and 310-11, or 320-10 and 320-11 of the connector 511 of the electronic device 501 may be connected in series respectively to the second transmitter capacitors $C_{TX21}$ or $C_{TX22}$ connected in series to the data transmission pins (e.g., 330-2 and 330-3, or 340-2 and 340-3) of the connector 550 of the external electronic device 505.

According to an embodiment, each of the first receiver capacitors $C_{RX11}$ or $C_{RX12}$ of the electronic device 501 may have a greater value than each of the second transmitter capacitors $C_{TX21}$ or $C_{TX22}$ connected in series to the second data transmission pins (e.g., 330-2 and 330-3, or 340-2 and 340-3) of the connector 550 of the external electronic device 505. For example, the first receiver capacitor $C_{RX11}$ of the electronic device 501 may have a greater value than the second transmitter capacitor $C_{TX21}$ of the external electronic device 505, and the first receiver capacitor $C_{RX12}$ of the electronic device 501 may have a greater value than the second transmitter capacitor $C_{TX22}$ of the external electronic device 505.

According to an embodiment, each of the first receiver capacitors $C_{RX11}$ or $C_{RX12}$ of the electronic device 501 may be set to a value such that the sum of the value of each first receiver capacitor $C_{RX11}$ or $C_{RX12}$ and the value of each second transmitter capacitor $C_{TX21}$ or $C_{TX22}$ of the external electronic device 505 (e.g., the sum of $C_{RX11}$ and $C_{TX21}$, or the sum of $C_{RX12}$ and $C_{TX22}$) is within a designated range. For example, when the electronic device 501 receives data from the external electronic device 505, each first receiver capacitor $C_{RX11}$ or $C_{RX12}$ of the electronic device 501 and each second transmitter capacitor $C_{TX21}$ or $C_{TX22}$ of the external electronic device 505 may be connected in series, and the sum of the values of each first receiver capacitor $C_{RX11}$ or $C_{RX12}$ and each second transmitter capacitor $C_{TX21}$ or $C_{TX22}$ connected in series (e.g., the sum of $C_{RX11}$ and $C_{TX21}$, or the sum of $C_{RX12}$ and $C_{TX22}$) may be within a designated range. According to an embodiment, the designated range may be from about 75 nF to 265 nF, as defined in the USB standard. For example, when each second transmitter capacitor $C_{TX21}$ or $C_{TX22}$ of the external electronic device 505 is 100 nF and each first receiver capacitor $C_{RX11}$ or $C_{RX12}$ of the electronic device 501 is 330 nF, the sum of the values of these two capacitors connected in series may be 75 nF. Further, when each second transmitter capacitor $C_{TX21}$ or $C_{TX22}$ of the external electronic device 505 is 220 nF and each first receiver capacitor $C_{RX11}$ or $C_{RX12}$ of the electronic device 501 is 330 nF, the sum of the values of these two capacitors connected in series may be 132 nF. The sums of the values of these two capacitors connected in series, which are 75 nF and 132 nF, may be included in the designated range of about 75 nF to 265 nF.

According to an embodiment, the range of the value of each first receiver capacitor $C_{RX11}$ or $C_{RX12}$ of the electronic device 501 may be about 75 nF to 265 nF or higher, as defined in the USB standard. According to an embodiment, based on the USB standard, each first receiver capacitor $C_{RX11}$ or $C_{RX12}$ may perform optimally at about 330 nF. According to an embodiment, each first receiver capacitor $C_{RX11}$ or $C_{RX12}$ may be between about 220 nF and 1000 nF.

The DC cutoff circuit 515-2 according to an embodiment may be connected to the first data transmission pins (e.g., 310-2 and 310-3, or 320-2 and 320-3), which transmit data (e.g., second data) to the external electronic device 505 connected via the connector 511, among the plurality of pins (e.g., 310-1 to 12, or 320-1 to 12) of the connector 511 and to the data transmission terminals $P_{TX1}$ or $P_{TX2}$ of the processor 520 connected respectively to the first data transmission pins 310-2 and 310-3, or 320-2 and 320-3.

According to an embodiment, the first data transmission pins 310-2 and 310-3, or 320-2 and 320-3 of the electronic device 501 may include an SSTXp pin (or TX+ pin) 310-2 or 320-2, or an SSTXn pin (or TX− pin) 310-3 or 320-3.

According to an embodiment, the DC cutoff circuit 515-2 may include one or more first transmitter capacitors $C_{TX11}$ or $C_{TX12}$ connected in series to the first data transmission pins 310-2 and 310-3, or 320-2 and 320-3 and to the data transmission terminals $P_{TX1}$ or $P_{TX2}$ of the processor 520 corresponding to the first data transmission pins 310-2 and 310-3, or 320-2 and 320-3. For example, the DC cutoff circuit 515-2 may include a first transmitter capacitor $C_{TX11}$ connected in series to the first data transmission pin (e.g., the SSTXp pin (or TX+ pin) 310-2 or 320-2) and to the data transmission terminal $P_{TX1}$ of the processor 520 and a first transmitter capacitor $C_{TX12}$ connected in series to the first data transmission pin (e.g., the SSTXn pin (or TX− pin) 310-3 or 320-3) and to the data transmission terminal $P_{TX2}$ of the processor 520.

According to an embodiment, each first transmitter capacitor $C_{TX11}$ or $C_{TX12}$ of the electronic device 501 may be an AC coupling capacitor that blocks a DC component from $V_{BUS}$ power introduced through each of the first data transmission pins 310-2 and 310-3, or 320-2 and 320-3 and passes an AC component. According to an embodiment, the value of each first transmitter capacitor $C_{TX11}$ or $C_{TX12}$ may range from about 75 nF to 265 nF, as defined in the USB standard.

According to an embodiment, each first transmitter capacitor $C_{TX11}$ or $C_{TX12}$ of the electronic device 501 may have a value smaller than that of each second receiver capacitor $C_{RX21}$ or $C_{RX22}$ connected in series to each of second data reception pins 330-10 and 330-11, or 340-10 and 340-11 of the connector 550 of the external electronic device 505.

Figure 5B:
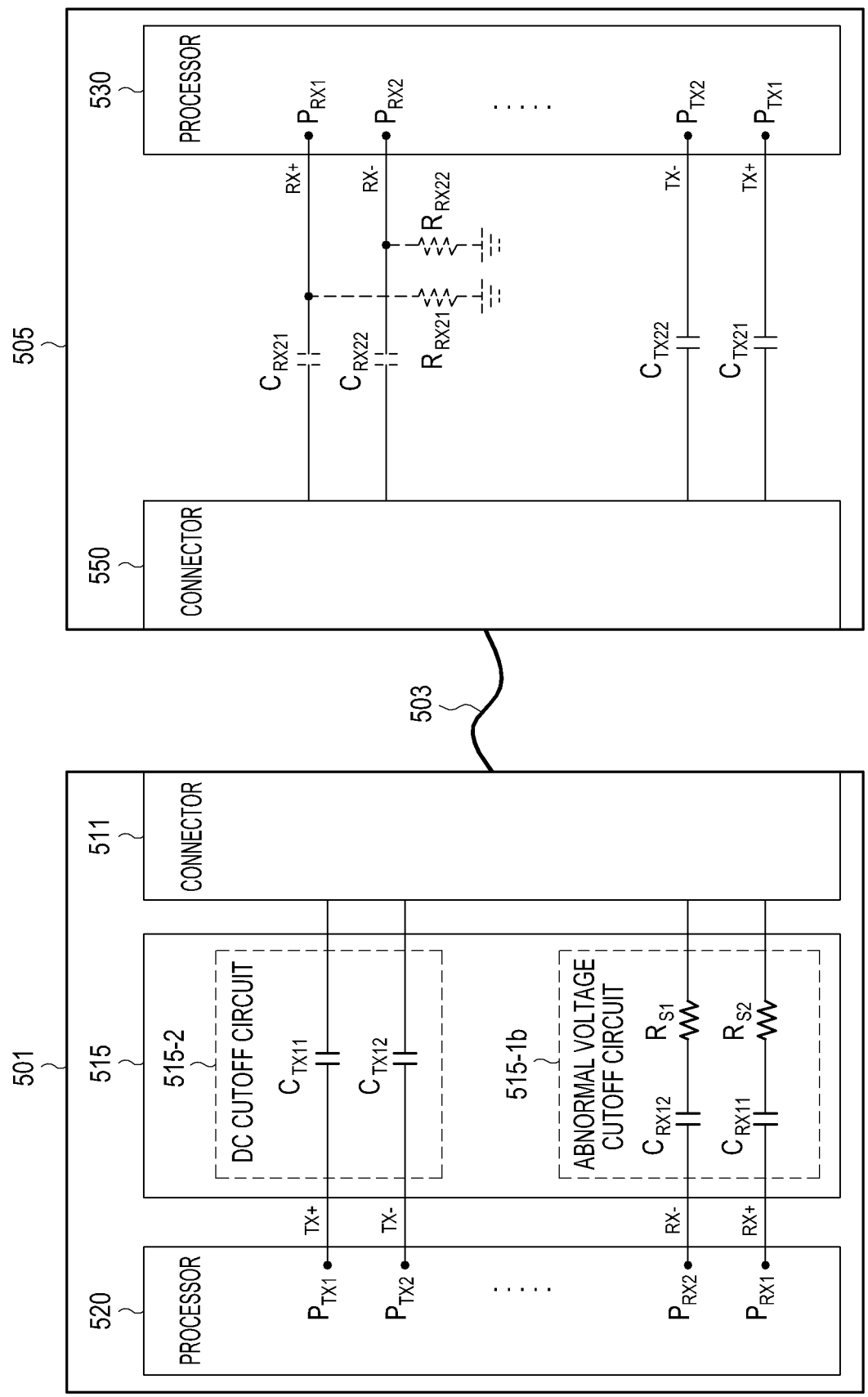

Referring to FIG. 5B, the abnormal voltage cutoff circuit 515-1b may be connected to the first data reception pins 310-10 and 310-11, or 320-10 and 320-11, which receive data (e.g., first data) from the external electronic device 505 connected via the connector 511, among the plurality of pins (e.g., 310-1 to 12, or 320-1 to 12) of the connector 511 and to the data reception terminals $P_{RX1}$ or $P_{RX2}$ of the processor 520 connected respectively to the first data reception pins 310-10 and 310-11, or 320-10 and 320-11.

According to an embodiment, the abnormal voltage cutoff circuit 515-1b may include one or more first receiver capacitors (e.g., $C_{RX11}$ or $C_{RX12}$) connected in series to the first data reception pins 310-10 and 310-11, or 320-10 and 320-11 and to the data reception terminals $P_{RX1}$ or $P_{RX2}$ of the processor 520 corresponding to the first data reception pins 310-10 and 310-11, or 320-10 and 320-11; and one or more passive elements connected in series respectively to the one or more first receiver capacitors (e.g., $C_{RX11}$ or $C_{RX12}$). For example, the abnormal voltage cutoff circuit 515-1b may include a first receiver capacitor $C_{RX11}$ connected in series to the first data reception pin (e.g., SSRXp pin (or RX+ pin)) 310-11 or 320-11 and to the data reception terminal $P_{RX1}$ of the processor 520; a passive element $R_{S1}$ connected in series to a front end or a rear end of the first receiver capacitor $C_{RX11}$; a first receiver capacitor $C_{RX12}$ connected in series to the first data reception pin (e.g., SSRXn pin (or RX− pin)) 310-10 or 320-10 and to the data reception terminal $P_{RX2}$ of the processor 520; and a passive element $R_{S2}$ connected in series to a front end or a rear end of the first receiver capacitor $C_{RX12}$. The first receiver capacitors $C_{RX11}$ or $C_{RX12}$ are the same as the first receiver capacitors $C_{RX11}$ or $C_{RX12}$ illustrated in FIG. 5A, and thus a detailed description thereof is omitted herein.

According to an embodiment, each passive element may be a series resistor $R_{S1}$ or $R_{S2}$. Each series resistor $R_{S1}$ or $R_{S2}$ may function as a damping resistor that drops abnormal voltage (e.g., surge voltage or leakage voltage) or an electric current introduced into each of the first data reception pins 310-10 and 310-11, or 320-10 and 320-11. According to an embodiment, each series resistor $R_{S1}$ or $R_{S2}$ may have a resistance ranging from 0 to 100Ω USB3.1 loss budget). For example, insertion loss according to the resistance of each series resistor $R_{S1}$ or $R_{S2}$ may be illustrated below in Table 2.

TABLE 2

| Rs (ohm) | Insertion Loss(dB) |
|---|---|
| 1 | −0.10 |
| 2 | −0.19 |
| 3 | −1.28 |
| 4 | −0.38 |
| 5 | −0.47 |
| 6 | −0.56 |
| 7 | −0.65 |
| 8 | −0.74 |
| 9 | −0.83 |
| 10 | −0.92 |
| 11 | −1.00 |
| 12 | −1.09 |
| 13 | −1.17 |
| 14 | −1.26 |
| 15 | −1.34 |
| 20 | −1.74 |
| 25 | −2.13 |
| 30 | −2.50 |
| 40 | −3.19 |
| 50 | −3.84 |
| 60 | −4.44 |
| 70 | −5.00 |
| 80 | −5.52 |
| 90 | −6.02 |
| 100 | −6.49 |

According to an embodiment, since insertion loss may increase with an increase in the resistance of each series resistor $R_{S1}$ or $R_{S2}$, a resistance value corresponding to an insertion loss of, for example, about −1 dB or less may be determined as the resistance of each series resistor $R_{S1}$ or $R_{S2}$. According to an embodiment, each series resistor $R_{S1}$ or $R_{S2}$ may be determined to have the minimum resistance depending on the condition of the electronic device 501. For example, when the electronic device 501 supports a series resistor in Table 2, each series resistor $R_{S1}$ or $R_{S2}$ may be determined to have a resistance of about 10Ω, corresponding to an insertion loss of about −1 dB or less.

Figure 5C:
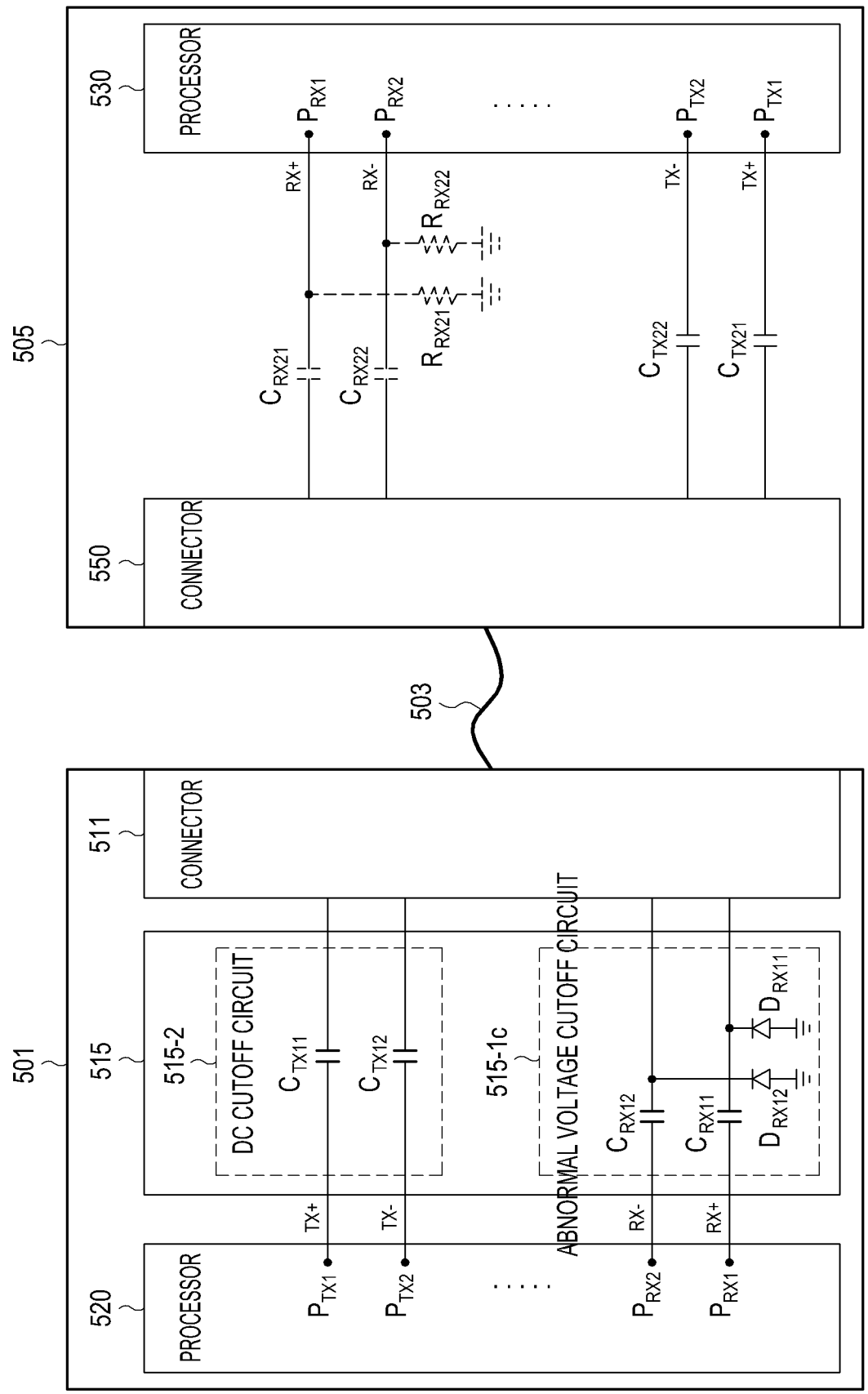

Referring to FIG. 5C, the abnormal voltage cutoff circuit 515-1c may be connected to the first data reception pins 310-10 and 310-11 or 320-10 and 320-11, which receive data (e.g., first data) from the external electronic device 505 connected via the connector 511, among the plurality of pins 310-1 to 12 or 320-1 to 12 of the connector 511, and to the data reception terminals $P_{RX1}$ or $P_{RX2}$ of the processor 520, connected respectively to the first data reception pins 310-10 and 310-11 or 320-10 and 320-11.

According to an embodiment, the abnormal voltage cutoff circuit 515-1c may include one or more first receiver capacitors (e.g., $C_{RX11}$ or $C_{RX12}$) connected in series to the first data reception pins 310-10 and 310-11, or 320-10 and 320-11 and to the data reception terminals $P_{RX1}$ or $P_{RX2}$ of the processor 520 corresponding to the first data reception pins 310-10 and 310-11, or 320-10 and 320-11; and one or more discharge elements connected in parallel respectively to the one or more first receiver capacitors $C_{RX11}$ or $C_{RX12}$. For example, the abnormal voltage cutoff circuit 515-1c may include a first receiver capacitor $C_{RX11}$ connected in series to the first data reception pin (e.g., SSRXp pin (or RX+ pin)) 310-11 or 320-11 and to the data reception terminal $P_{RX1}$ of the processor 520; a discharge element $D_{RX1}$ connected in parallel to the first receiver capacitor $C_{RX11}$ between the front end or the rear end of the first receiver capacitor $C_{RX11}$ and the ground of the electronic device 501; a first receiver capacitor $C_{RX12}$ connected in series to the first data reception pin (e.g., SSRXn pin (or RX– pin)) 310-10 or 320-10 and to the data reception terminal $P_{RX2}$ of the processor 520; and a discharge element $D_{RX2}$ connected in parallel to the first receiver capacitor $C_{RX12}$ between the front end or the rear end of the first receiver capacitor $C_{RX12}$ and the ground of the electronic device 501. The first receiver capacitors $C_{RX11}$ or $C_{RX12}$ are the same as the first receiver capacitors $C_{RX11}$ or $C_{RX12}$ illustrated in FIG. 5A, and thus a detailed description thereof is omitted herein.

According to an embodiment, each of the one or more discharge elements may be a diode (e.g., $D_{RX1}$ or $D_{RX2}$). Each diode $D_{RX1}$ or $D_{RX2}$ may function to discharge voltage or an electric current between each first receiver capacitor $C_{RX11}$ or $C_{RX12}$ connected in series to the first data reception pins 310-10 and 310-11, or 320-10 and 320-11 of the electronic device 501 and each second transmitter capacitor $C_{TX21}$ or $C_{TX22}$ connected in series to the second data transmission pins (e.g., 330-2 and 330-3, or 340-2 and 340-3) of the external electronic device 505 connected to the first data reception pins 310-10 and 310-11 or 320-10 and 320-11. According to an embodiment, each diode $D_{RX1}$ or $D_{RX2}$ may function as an electrostatic discharge (ESD) diode or as an element capable of preventing electrical overstress (EOS).

Figure 5D:
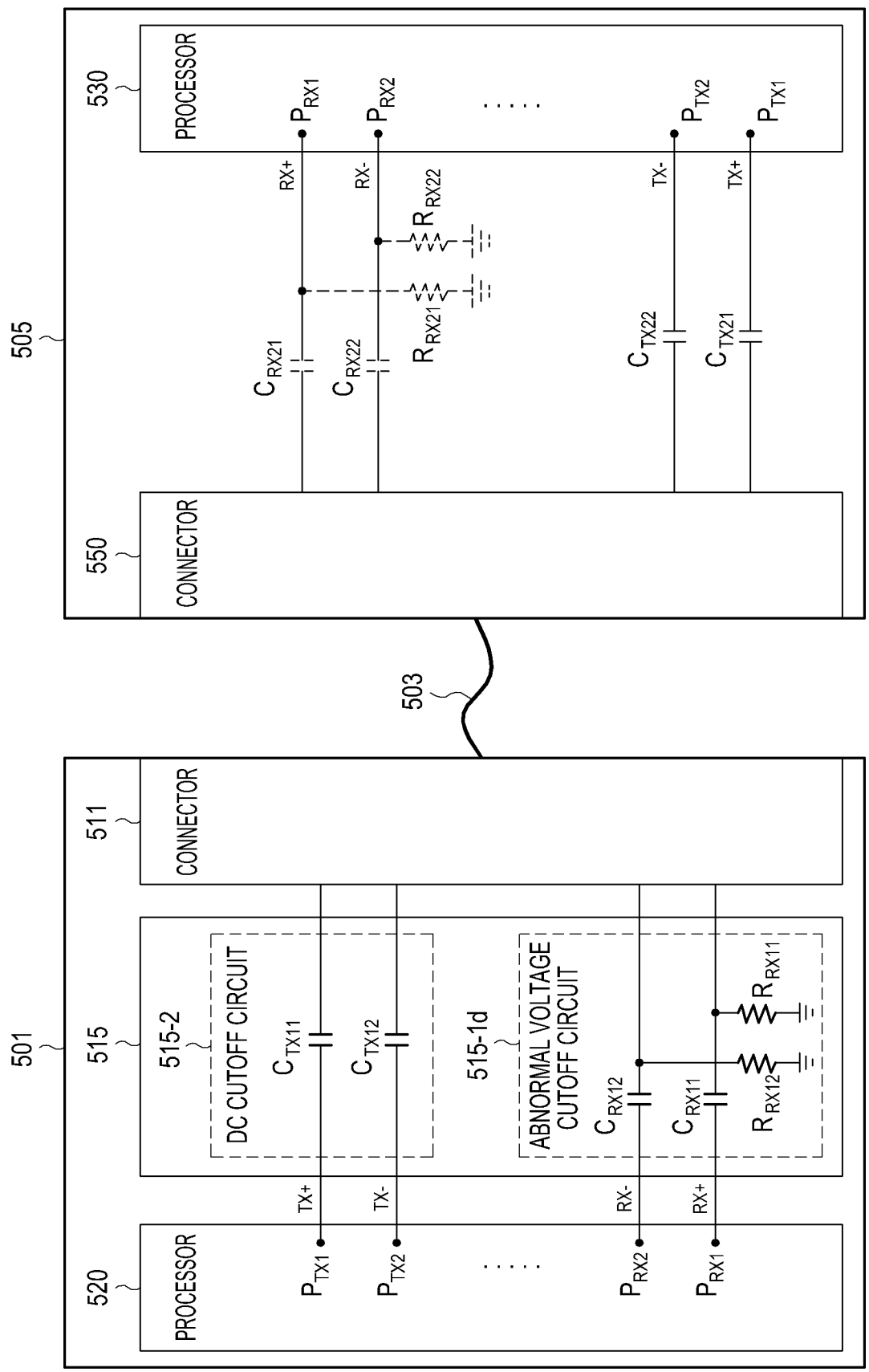

Referring to FIG. 5D, the abnormal voltage cutoff circuit 515-1d may be connected to the first data reception pins 310-10 and 310-11, or 320-10 and 320-11, which receive data (e.g., first data) from the external electronic device 505 connected via the connector 511, among the plurality of pins 310-1 to 12, or 320-1 to 12 of the connector 511, and to the data reception terminals $P_{RX1}$ or $P_{RX2}$ of the processor 520, connected respectively to the first data reception pins 310-10 and 310-11, or 320-10 and 320-11.

According to an embodiment, the abnormal voltage cutoff circuit 515-1d may include one or more first receiver capacitors (e.g., $C_{RX11}$ or $C_{RX12}$) connected in series to the first data reception pins 310-10 and 310-11, or 320-10 and 320-11 and to the data reception terminals $P_{RX1}$ or $P_{RX2}$ of the processor 520 corresponding to the first data reception pins 310-10 and 310-11, or 320-10 and 320-11; and one or more discharge elements connected in parallel respectively to the first receiver capacitors $C_{RX11}$ or $C_{RX12}$. For example, the abnormal voltage cutoff circuit 515-1d may include a first receiver capacitor $C_{RX11}$ connected in series to the first data reception pin (e.g., SSRXp pin (or RX+ pin)) 310-11 or 320-11 and to the data reception terminal $P_{RX1}$ of the processor 520; a discharge element $D_{RX1}$ connected in parallel to the first receiver capacitor $C_{RX11}$ between the front end or the rear end of the first receiver capacitor $C_{RX11}$ and the ground of the electronic device 501; a first receiver capacitor $C_{RX12}$ connected in series to the first data reception pin (e.g., SSRXn pin (or RX– pin)) 310-10 or 320-10 and to the data reception terminal $P_{RX2}$ of the processor 520; and a discharge element $D_{RX2}$ connected in parallel to the first receiver capacitor $C_{RX12}$ between the front end or the rear end of the first receiver capacitor $C_{RX12}$ and the ground of the electronic device 501. The first receiver capacitors $C_{RX11}$ or $C_{RX12}$ are the same as the first receiver capacitors $C_{RX11}$ or $C_{RX12}$ illustrated in FIG. 5A, and thus a detailed description thereof is omitted herein.

According to an embodiment, each of the one or more discharge elements may be a parallel resistor (e.g., $R_{RX1}$ or $R_{RX2}$). Each parallel resistor $R_{RX1}$ or $R_{RX2}$ may function to discharge voltage or an electric current between each first receiver capacitor $C_{RX11}$ or $C_{RX12}$ connected in series to the first data reception pins 310-10 and 310-11, or 320-10 and 320-11 of the electronic device 501 and a corresponding second transmitter capacitor $C_{TX21}$ or $C_{TX22}$ connected in series to the second data transmission pins (e.g., 330-2 and 330-3, or 340-2 and 340-3) of the external electronic device 505 connected to the first data reception pins 310-10 and 310-11, or 320-10 and 320-11. Further, each parallel resistor $R_{RX1}$ or $R_{RX2}$ may function to prevent floating of the node.

Table 3 illustrates insertion loss according to the resistance of each parallel resistor $R_{RX1}$ or $R_{RX2}$.

TABLE 3

| | $R_{RX}$ (kohm) | | | | | | | | |
|---|---|---|---|---|---|---|---|---|---|
| | 1 | 10 | 50 | 100 | 200 | 300 | 500 | 1000 | 2000 |
| Insertion Loss(dB) | −0.1933 | −0.0195 | 0.0039 | −0.0020 | −0.0010 | −0.0007 | −0.0005 | −0.0002 | −0.0001 |

According to an embodiment, as illustrated in Table 3, insertion loss may decrease with an increase in the resistance of each parallel resistor $R_{RX1}$ or $R_{RX2}$. According to an embodiment, the resistance of each parallel resistor $R_{RX1}$ or $R_{RX2}$ may be set to decrease when the capacitance of each first receiver capacitor $C_{RX11}$ or $C_{RX12}$ of the electronic device 501 increases. For example, when the capacitance of each first receiver capacitor $C_{RX11}$ or $C_{RX12}$ is about 1000 nF, the resistance of each parallel resistor $R_{RX1}$ or $R_{RX2}$ may be about 100 kΩ. When the capacitance of each first receiver capacitor $C_{RX11}$ or $C_{RX12}$ is about 220 nF, the resistance of each parallel resistor $R_{RX1}$ or $R_{RX2}$ may be about 300 kΩ.

Figure 5E:
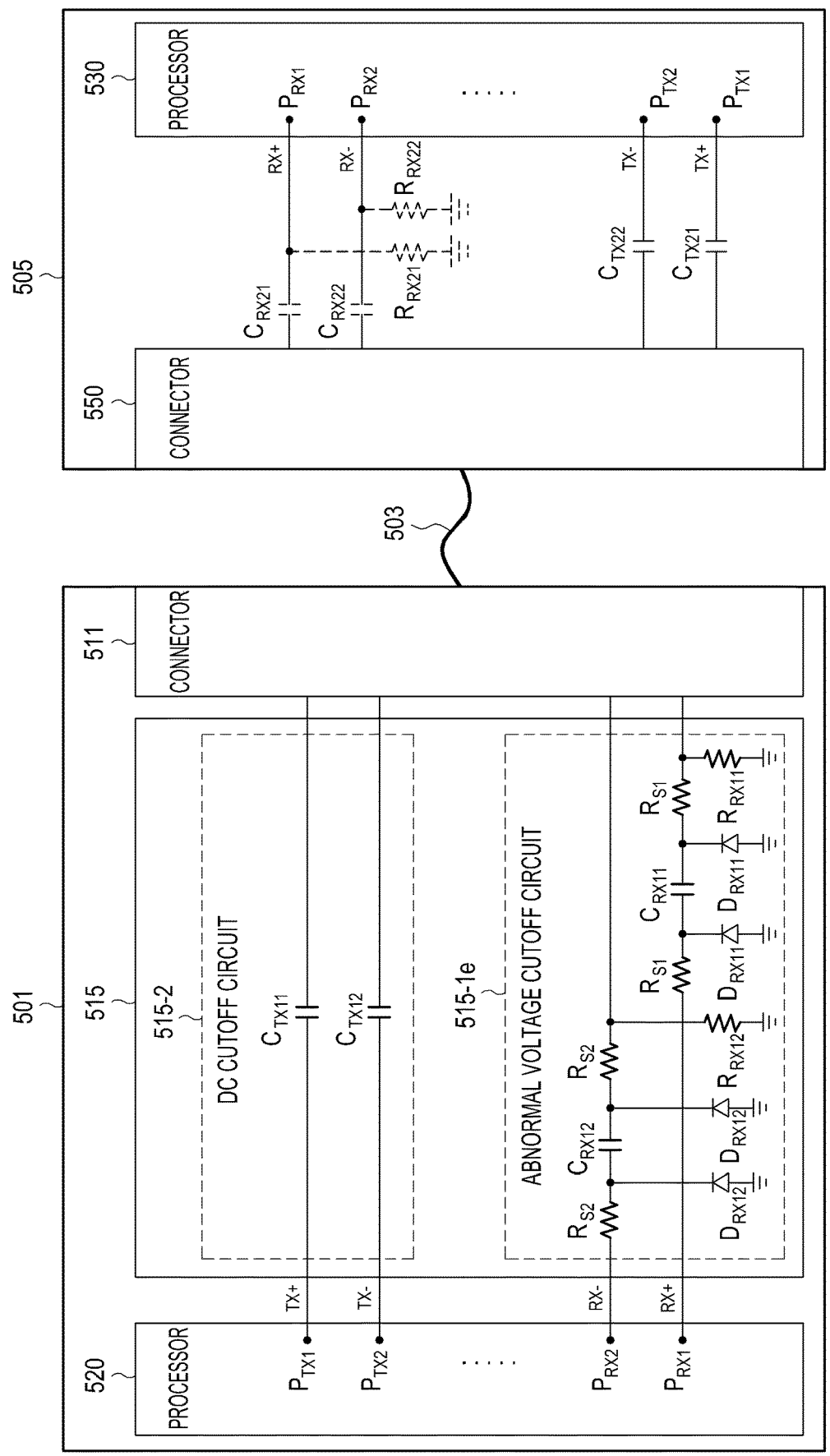

Referring to FIG. 5E, the abnormal voltage cutoff circuit 515-1e may be connected to the first data reception pins 310-10 and 310-11, or 320-10 and 320-11, which receive data (e.g., first data) from the external electronic device 505 connected via the connector 511, among the plurality of pins 310-1 to 12, or 320-1 to 12 of the connector 511, and to the data reception terminals $P_{RX1}$ or $P_{RX2}$ of the processor 520, connected respectively to the first data reception pins 310-10 and 310-11, or 320-10 and 320-11.

According to an embodiment, the abnormal voltage cutoff circuit 515-1e may include one or more first receiver capacitors (e.g., $C_{RX11}$ or $C_{RX12}$) connected in series to the first data reception pins 310-10 and 310-11, or 320-10 and 320-11 and to the data reception terminals $P_{RX1}$ or $P_{RX2}$ of the processor 520 corresponding to the first data reception pins 310-10 and 310-11, or 320-10 and 320-11; one or more passive elements $R_{S1}$ or $R_{S2}$ connected in series respectively to the one or more first receiver capacitors $C_{RX11}$ or $C_{RX12}$; and one or more discharge elements connected in parallel respectively to the one or more first receiver capacitors (e.g., $C_{RX11}$ or $C_{RX12}$) and to the ground of the electronic device 501. For example, the abnormal voltage cutoff circuit 515-1e may include a first receiver capacitor $C_{RX11}$ connected in series to the first data reception pin (e.g., SSRXp pin (or RX+ pin)) 310-11 or 320-11 and to the data reception terminal $P_{RX1}$ of the processor 520; a passive element $R_{S1}$ connected in series to the front end and the rear end of the first receiver capacitor $C_{RX11}$; discharge elements $D_{RX11}$ and $R_{RX11}$ connected in parallel to the first receiver capacitor $C_{RX11}$ between the front end and the rear end of the first receiver capacitor $C_{RX11}$ and the ground of the electronic device 501; a first receiver capacitor $C_{RX12}$ connected in series to the first data reception pin (e.g., SSRXn pin (or RX− pin)) 310-10 or 320-10 and to the data reception terminal $P_{RX2}$ of the processor 520; a passive element $R_{S2}$ connected in series to the front end and the rear end of the first receiver capacitor $C_{RX12}$; and discharge elements $D_{RX12}$ and $R_{RX12}$ connected in parallel to the first receiver capacitor $C_{RX12}$ between the front end and the rear end of the first receiver capacitor $C_{RX12}$ and the ground of the electronic device 501. The first receiver capacitors $C_{RX11}$ or $C_{RX12}$ are the same as the first receiver capacitors $C_{RX11}$ or $C_{RX12}$ illustrated in FIG. 5A, and thus a detailed description thereof is omitted herein.

According to an embodiment, each of the one or more passive elements may be a series resistor $R_{S1}$ or $R_{S2}$, and each of the one or more discharge elements may be a diode $D_{RX11}$ or $D_{RX12}$ or a parallel resistor $R_{RX11}$ or $R_{RX12}$. Each series resistor $R_{S1}$ or $R_{S2}$, each diode $D_{RX11}$ or $D_{RX12}$, and each parallel resistor $R_{RX11}$ or $R_{RX12}$ are the same as those illustrated in FIGS. 5B and 5C, and thus a detailed description thereof is omitted herein.

The abnormal voltage cutoff circuits 515-1a to 515-1e are not limited to those illustrated in FIGS. 5A to 5E, and may include various combinations using at least one series resistor, at least one parallel resistor, at least one diode, or at least one transistor.

Figure 6A:
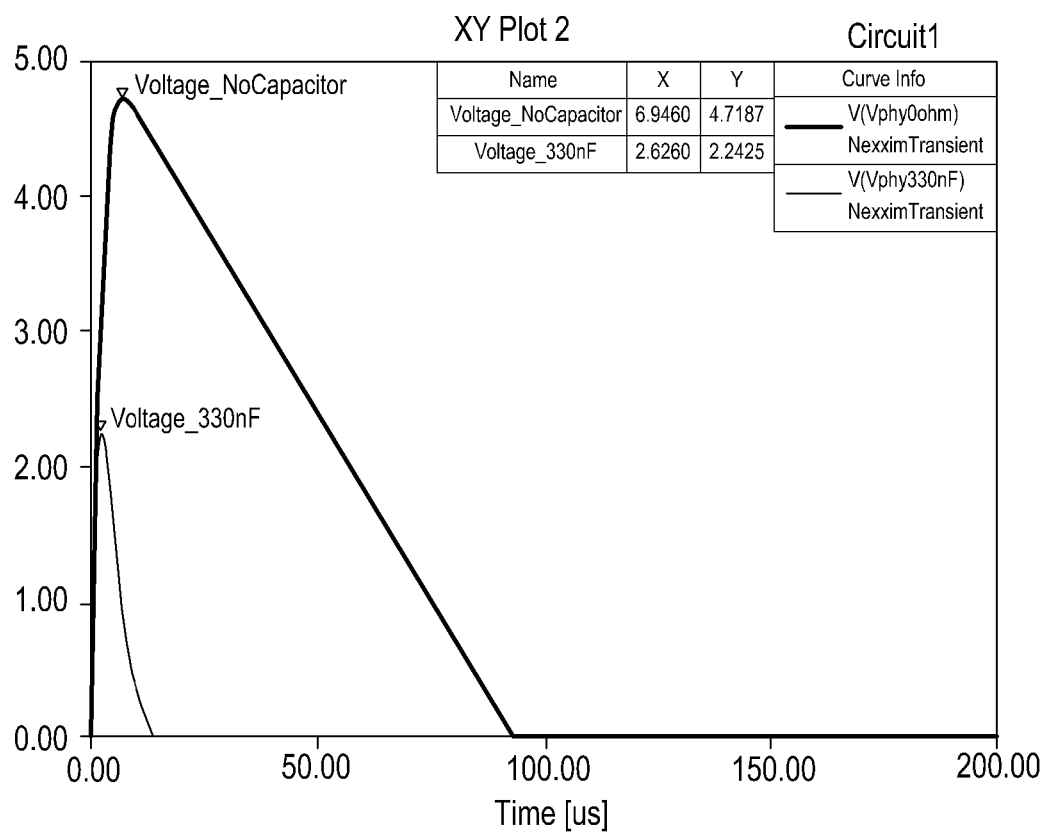
FIG. 6A illustrates a graph comparing the voltage applied to a connector when abnormal voltage is introduced depending on the presence or absence of a receiver capacitor connected to a data reception pin of the connector of an electronic device, according to an embodiment.
Figure 6B:
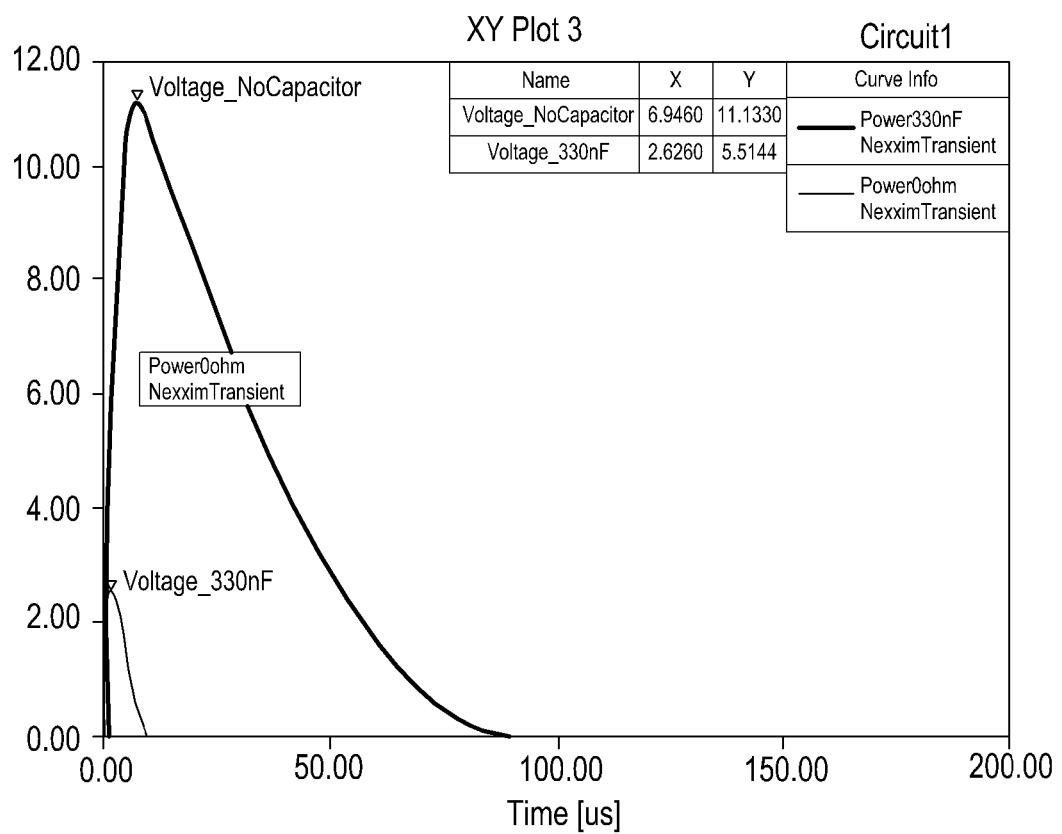
FIG. 6B illustrates a graph comparing the power applied to a connector when abnormal voltage is introduced depending on the presence or absence of a receiver capacitor connected to a data reception pin of the connector of an electronic device, according to an embodiment.

FIGS. 6A and 6B illustrate graphs comparing voltage and power applied to a connector when leakage voltage is introduced depending on the presence or absence of a receiver capacitor connected to a data reception pin of the connector of an electronic device according to an embodiment.

Specifically, FIG. 6A illustrates the voltage applied to the connector 511 depending on the presence or absence of a capacitor (e.g., the first receiver capacitor $C_{RX11}$ or $C_{RX12}$) connected in series to a data reception pin (e.g., the first data reception pins 310-10 and 310-11 or 320-10 and 320-11) of the connector (e.g., the connector 511) of the electronic device (e.g., the electronic device 501). In FIG. 6A, the x-axis denotes time (in units of seconds (s)), and the y-axis denotes voltage (in units of Volts (V)).

In the absence of the capacitor $C_{RX11}$ or $C_{RX12}$ connected in series to the data reception pins 310-10 and 310-11, or 320-10 and 320-11 of the connector 511 of the electronic device 501, a voltage of about 4.7 V is applied to the connector 511. However, in the presence of the capacitor $C_{RX11}$ or $C_{RX12}$ having a capacitance of 100 nF, a voltage of about 1.1 V is applied to the connector 511. That is, in the presence of the capacitor $C_{RX11}$ or $C_{RX12}$, the voltage applied to the connector 511 is reduced by about 75% compared to when the capacitor $C_{RX11}$ or $C_{RX12}$ is absent.

FIG. 6B illustrates the power applied to the connector 511 depending on the presence or absence of the receiver capacitor $C_{RX11}$ or $C_{RX12}$ connected in series to the data reception pins 310-10 and 310-11, or 320-10 and 320-11) of the connector 511 of the electronic device 501. In FIG. 6B, the x-axis denotes time, and the y-axis denotes power (in units of watts (W)).

In the absence of the capacitor $C_{RX11}$ or $C_{RX12}$ connected in series to the data reception pins 310-10 and 310-11, or 320-10 and 320-11 of the connector 511 of the electronic device 501, a power of about 11 W is applied to the connector 511. However, in the presence of the capacitor $C_{RX11}$ or $C_{RX12}$ having a capacitance of 100 nF, a power of about 0.6 W is applied to the connector 511. That is, in the presence of the capacitor $C_{RX11}$ or $C_{RX12}$, the power applied to the connector 511 is reduced by about 94% compared to when the capacitor $C_{RX11}$ or $C_{RX12}$ is absent.

As illustrated in FIGS. 6A and 6B, in data reception via the connector 511, abnormal voltage (e.g., surface or leakage voltage) or power introduced into the data reception pins 310-10 and 310-11, or 320-10 and 320-11 through each capacitor $C_{RX11}$ or $C_{RX12}$ connected in series to each of the data reception pins 310-10 and 310-11, or 320-10 and 320-11 may be remarkably reduced.

Figure 7:
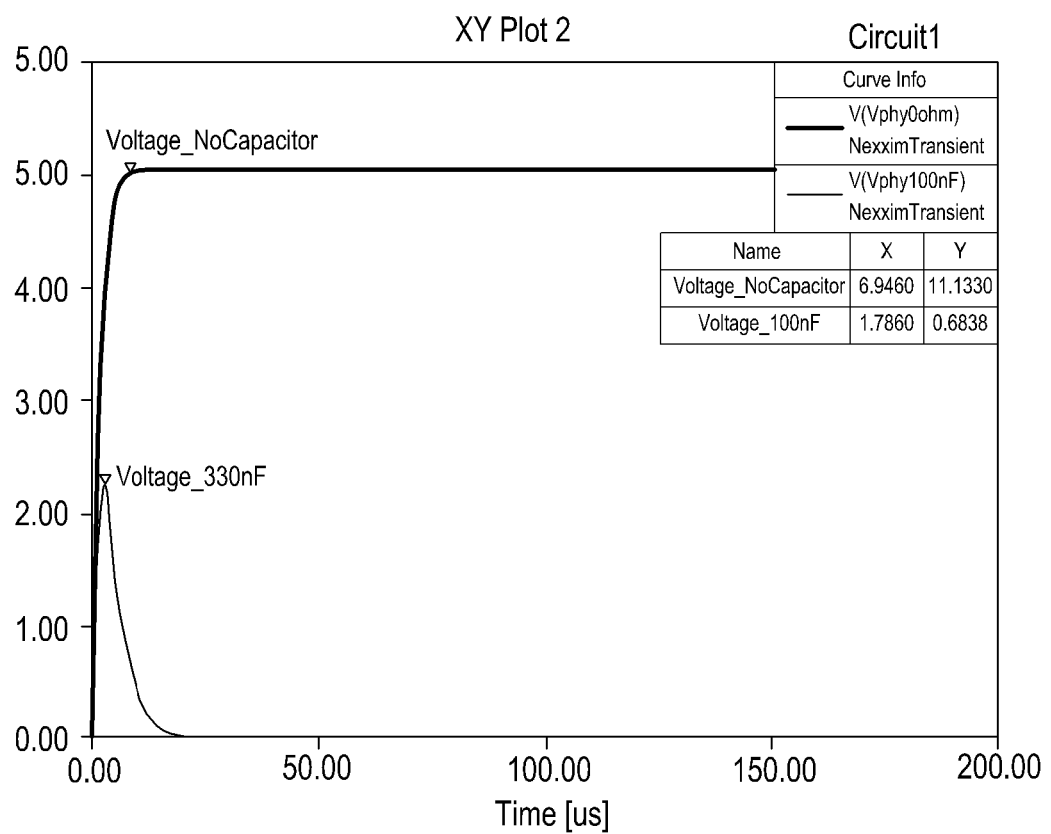
FIG. 7 illustrates a graph comparing the voltage applied to a connector when abnormal voltage is introduced depending on the presence or absence of a receiver capacitor connected to a data reception pin of the connector of an electronic device, according to an embodiment.

FIG. 7 illustrates a graph comparing voltage applied to a power supply pin of a connector and voltage applied to a connector in the event of a short circuit depending on a presence or absence of a receiver capacitor connected to a data reception pin of the connector of an electronic device according to an embodiment. In FIG. 7, the x-axis denotes time (in units of seconds (s)), and the y-axis denotes voltage (in units of volts (V)).

Specifically, FIG. 7 illustrates voltage (e.g., $V_{BUS}$ voltage) applied to a power supply pin (e.g., the $V_{BUS}$ pins 310-4 and 310-9, or 320-4 and 320-9) and voltage applied to the connector 511 in the event of a short circuit depending on the presence or absence of a capacitor (e.g., the first receiver capacitor $C_{RX11}$ or $C_{RX12}$) connected in series to a data reception pin (e.g., the first data reception pins 310-10 and 310-11 or 320-10 and 320-11) of the connector (e.g., the connector 511) of the electronic device (e.g., the electronic device 501).

When the data reception pins 310-10 and 310-11, or 320-10 and 320-11 of the connector 511 of the electronic device 501 are short-circuited with the power supply pins 310-4 and 310-9, or 320-4 and 320-9, a voltage of about 5 V introduced through the data reception pins 310-10 and 310-11, or 320-10 and 320-11 may be continuously applied to the connector 511 in the absence of the capacitor $C_{RX11}$ or $C_{RX12}$ connected in series to the data reception pins 310-10 and 310-11, or 320-10 and 320-11, whereas a voltage of about 2.2 V is applied for about 20 μs and then disappears in the presence of the capacitor $C_{RX11}$ or $C_{RX12}$ having a capacitance of 330 nF.

As illustrated in FIG. 7, even when a short circuit occurs due to the presence of foreign substances or the like between the data reception pins 310-10 and 310-11, or 320-10 and 320-11 of the connector 511 and the power supply pins 310-4 and 310-9, or 320-4 and 320-9 disposed adjacent thereto, abnormal voltage (e.g., surface or leakage voltage) or power introduced into the data reception pins 310-10 and 310-11, or 320-10 and 320-11 through each capacitor $C_{RX11}$ or $C_{RX12}$ connected in series to a corresponding one of the data reception pins 310-10 and 310-11, or 320-10 and 320-11 may be remarkably reduced.

Figure 8:
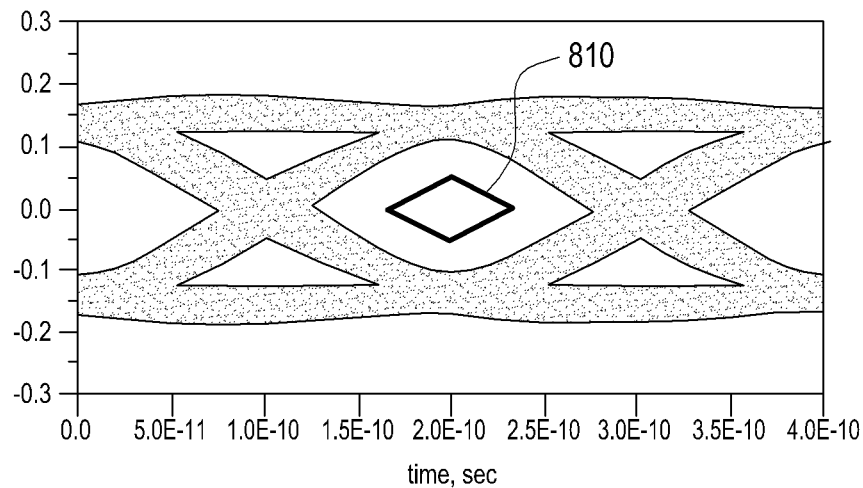
FIG. 8 illustrates the results of testing the signal quality of an electronic device, according to an embodiment.
Figure 8:
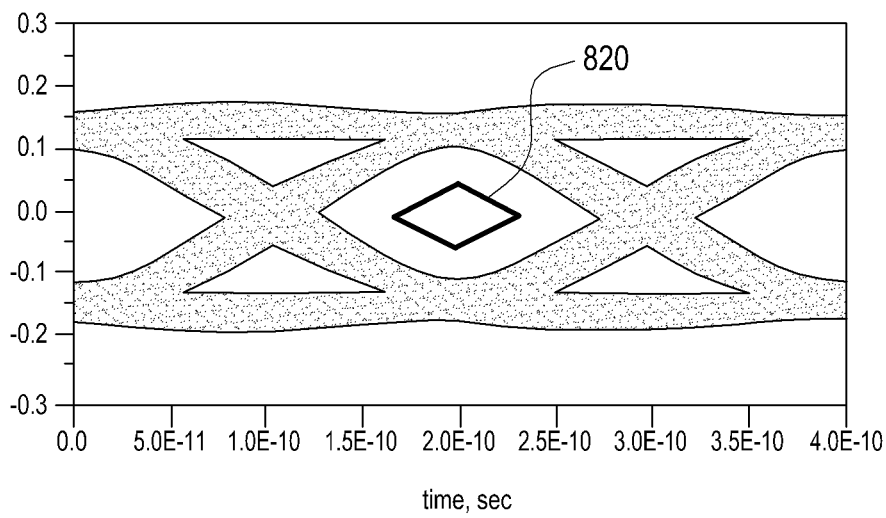

FIG. 8 illustrates the results of testing the signal quality of an electronic device according to an embodiment. The upper image of FIG. 8 is a jitter & bathtub graph showing a signal quality test result in data transmission and reception by an electronic device (e.g., the electronic device 501) including an abnormal voltage cutoff circuit (e.g., the abnormal voltage cutoff circuit 515-1a to 1e), and the lower image of FIG. 8 is a jitter & bathtub graph showing a signal quality test result in data transmission and reception by a conventional electronic device not including an abnormal voltage cutoff circuit 515-1a to 515-1e. In FIG. 8, the x-axis denotes time (in units of seconds (s)), and the y-axis denotes a bit error rate (BER).

Referring to FIG. 8, comparing the upper and lower jitter & bathtub graphs, the BER is represented per unit time. For example, the BER may be identified based on the size of an eye opening 810 or 820. Specifically, it is determined that a greater size of the eye opening 810 or 820 indicates higher signal quality. Comparing the upper and lower graphs of FIG. 8, the graphs are the same except that an eye opening 810 of the upper graph has a height of 1.191 and an eye opening 820 of the lower graph has a height of 0.193. That is, even though an abnormal voltage cutoff circuit (e.g., the abnormal voltage cutoff circuit 515-1a to 1e) according to an embodiment is connected to a data reception pin (e.g., the first data reception pins 310-10 and 310-11, or 320-10 and 320-11) of a connector (e.g., the connector 511), as in the electronic device 501, signal quality in data transmission and reception with the external electronic device 505 is not substantially changed, which means that the presence of the abnormal voltage cutoff circuit has almost no effect on the signal quality. Accordingly, the electronic device 501 according to the present disclosure may block or drop abnormal voltage (e.g., surge voltage or leakage voltage) or an electric current introduced into a data reception pin (e.g., the first data reception pins 310-10 and 310-11 or 320-10 and 320-11), without affecting signal quality in data reception from the external electronic device 505.

According to an embodiment, an electronic device (e.g., the electronic device 501) may include a connector (e.g. the connector 511) including a plurality of pins (e.g., 310-1 to 12 or 320-1 to 12); at least one processor (e.g., the processor 520) electrically connected to the connector 511; and an abnormal voltage cutoff circuit (e.g., a leakage voltage cutoff circuit 515-1a to 1e) connected to a first data reception pin (e.g., 310-10 and 310-11 or 320-10 and 320-11), which receives data from an external electronic device (e.g., the external electronic device 505), among the plurality of pins 310-1 to 12 or 320-1 to 12, and to the processor 520.

According to an embodiment, the abnormal voltage cutoff circuit 515-1a may include a first receiver capacitors (e.g., $C_{RX11}$ or $C_{RX12}$) connected in series to the first data reception pin 310-10 and 310-11 or 320-10 and 320-11 and to a data reception terminal (e.g., $P_{RX1}$ or $P_{RX2}$) of the processor 520 corresponding to the first data reception pin 310-10 and 310-11 or 320-10 and 320-11.

According to an embodiment, the first data reception pins 310-10 and 310-11 or 320-10 and 320-11 may be connected to second data transmission pins (e.g., 330-2 and 330-3 or 340-2 and 340-3), which transmit the data to the electronic device 501, among a plurality of pins (e.g., 330-1 to 12 or 340-1 to 12) included in a connector (e.g., the connector 550) of the external electronic device 505.

According to an embodiment, the electronic device 501 may further include a DC cutoff circuit (e.g., the DC cutoff circuit 515-2) connected to first data transmission pins (e.g., 310-2 and 310-3 or 320-2 and 320-3), which transmit data to the external electronic device 505 connected via the connector 511, among the plurality of pins 310-1 to 12 or 320-1 to 12, and to the processor 520.

According to an embodiment, the DC cutoff circuit 515-2 may include a first transmitter capacitor $C_{TX11}$ or $C_{TX12}$ connected in series to the first data transmission pin 310-2 and 310-3 or 320-2 and 320-3 and to a data transmission terminal (e.g., $P_{TX1}$ or $P_{TX2}$) of the processor 520 corresponding to the first data transmission pin 310-2 and 310-3 or 320-2 and 320-3.

According to an embodiment, the first data transmission pin 310-2 and 310-3 or 320-2 and 320-3 may be connected to a second data reception pin (e.g., 330-10 and 330-11 or 340-10 and 340-11), which receives the data from the electronic device 501, among the plurality of pins 330-1 to 12 or 340-1 to 12 included in the connector 550 of the external electronic device 505.

According to an embodiment, an electronic device (e.g., the electronic device 501) may include a connector (e.g., the connector 511) including at least one first data reception pin (e.g., 310-10 and 310-11 or 320-10 and 320-11), which receives data from an external electronic device (e.g., the external electronic device 505) and at least one first data transmission pin (e.g., 310-2 and 310-3 or 320-2 and 320-3), which transmit data to the external electronic device 505; at least one processor (e.g., the processor 520) electrically connected to the connector 511; at least one first circuit (e.g., an abnormal voltage cutoff circuit 515-1a to 1e) connected to the at least one first data reception pin 310-10 and 310-11 or 320-10 and 320-11 and to the processor 520; and at least one second circuit (e.g., the DC cutoff circuit 515-2) connected to the at least one first data transmission pin 310-2 and 310-3 or 320-2 and 320-3 and to the processor 520.

According to an embodiment, an electronic device (e.g., the electronic device 501) may include a power regulator (e.g., the power management module 488); a processor (e.g., the processor 520) electrically connected to the power regulator 488; a connector (e.g., the connector 511) including one or more first power pins (e.g., the $V_{BUS}$ pins 310-9 or 320-9) that electrically connect an external electronic device (e.g., the external electronic device 505) with the power regulator 488 and one or more first data reception pins (e.g., 310-10 and 310-11 or 320-10 and 320-11) that are disposed adjacent to at least some of the one or more first power pins 310-9 or 320-9 and electrically connect second data transmission pins (e.g., 330-2 and 330-3 or 340-2 and 340-3) of a connector (e.g., the connector 550) of the external electronic device 505 with data reception terminals (e.g., $P_{RX1}$ or $P_{RX2}$) of the processor 520; and one or more first receiver capacitors (e.g., $C_{RX11}$ or $C_{RX12}$) electrically connected to the one or more first data reception pins 310-10 and 310-11 or 320-10 and 320-11 and to the processor 520 in order to block power that may be introduced into the one or more first data reception pins 310-10 and 310-11 or 320-10 and 320-11 from the at least some of the one or more first power pins 310-9 or 320-9.

According to an embodiment, the connector 511 may be a USB type-C connector.

According to an embodiment, the one or more first data reception pins 310-10 and 310-11 or 320-10 and 320-11 may include an SSRXn pin (or RX− pin, e.g., 310-10 or 320-10) or an SSRXp pin (or RX+ pin, e.g., 310-11 or 320-11).

According to an embodiment, each of the first receiver capacitors $C_{RX11}$ or $C_{RX12}$ may have a greater value than each of second transmitter capacitors (e.g., $C_{TX21}$ or $C_{TX22}$) connected in series to each of the second data transmission pins 330-2 and 330-3 or 340-2 and 340-3 of the external electronic device 505.

According to an embodiment, each of the first receiver capacitors $C_{RX11}$ or $C_{RX12}$ may be set to a value such that the sum of the value of each first receiver capacitor $C_{RX11}$ or $C_{RX12}$, and the value of each second transmitter capacitor $C_{TX21}$ or $C_{TX22}$ of the external electronic device 505 is within a designated range.

According to an embodiment, the electronic device may further include one or more passive elements connected in series respectively to the one or more first receiver capacitors $C_{RX11}$ or $C_{RX12}$.

According to an embodiment, the one or more passive elements may include one or more resistors (e.g., the series resistors $R_{S1}$ or $R_{S2}$) connected in series to a front end or a rear end of each of the first receiver capacitors $C_{RX11}$ or $C_{RX12}$.

According to an embodiment, the electronic device may further include one or more discharge elements connected to one end of each of the one or more first receiver capacitors $C_{RX11}$ or $C_{RX12}$ and to the ground of the electronic device 501 such that the discharge elements are connected in parallel respectively to the one or more first receiver capacitors $C_{RX11}$ or $C_{RX12}$.

According to an embodiment, each discharge element may include at least one resistor (e.g., a parallel resistor $R_{RX1}$ or $R_{RX2}$), at least one diode (e.g., $D_{RX1}$ or $D_{RX2}$), at least one transistor, or a combination thereof connected in parallel to a corresponding first receiver capacitor $C_{RX11}$ or $C_{RX12}$ between the front end or the rear end of each first receiver capacitor $C_{RX11}$ or $C_{RX12}$ and the ground of the electronic device 501.

According to an embodiment, the electronic device may further include one or more series resistors $R_{S1}$ or $R_{S2}$ connected in series to the one or more first receiver capacitors $C_{RX11}$ or $C_{RX12}$; parallel resistors $R_{RX1}$ or $R_{RX2}$ connected to a front end or a rear end of each of the one or more first receiver capacitors $C_{RX11}$ or $C_{RX12}$ and to the ground such that the parallel resistors are connected in parallel respectively to the one or more first receiver capacitors $C_{RX11}$ or $C_{RX12}$; and one or more diodes $D_{RX1}$ or $D_{RX2}$ connected to the front end or the rear end of each of the one or more first receiver capacitors $C_{RX11}$ or $C_{RX12}$ and to the ground such that the diodes are connected in parallel respectively to the one or more first receiver capacitors $C_{RX11}$ or $C_{RX12}$.

According to an embodiment, the connector 511 may further include one or more first data transmission pins (e.g., 310-2 and 310-3 or 320-2 and 320-3) that electrically connect second data reception pins (e.g., 330-10 and 330-11 or 340-10 and 340-11) of the connector 550 of the external electronic device 505 respectively to data transmission terminals $P_{TX1}$ or $P_{TX2}$ of the processor 520. The electronic device 501 may further include one or more first transmitter capacitors (e.g., $C_{TX11}$ or $C_{TX12}$) that are electrically connected respectively to the one or more first data transmission pins 310-2 and 310-3 or 320-2 and 320-3 and to the processor 520.

According to an embodiment, the first data transmission pins 310-2 and 310-3 or 320-2 and 320-3 may include an SSTXn pin (or TX− pin, e.g., 310-3 or 320-3) or an SSTXp pin (or TX+ pin, e.g., 310-2 or 320-2).

According to an embodiment, each of the first transmitter capacitors $C_{TX11}$ or $C_{TX12}$ may have a smaller value than each of second receiver capacitors (e.g., $C_{RX21}$ or $C_{RX22}$) connected in series respectively to the second data reception pins 330-10 and 330-11 or 340-10 and 340-11 of the external electronic device 505.

According to an embodiment, an electronic device (e.g., the electronic device 501) may include a processor (e.g., the processor 520); a USB connector (e.g., the connector 511) including a transmission pin (e.g., 310-2 and 310-3 or 320-2 and 320-3) that electrically connects a reception pin (e.g., 330-10 and 330-11 or 340-10 and 340-11) of an external electronic device (e.g., the external electronic device 505) to a data transmission terminal (e.g., $P_{TX1}$ or $P_{TX2}$) of the processor 520, and a reception pin (e.g., 310-10 and 310-11 or 320-10 and 320-11) that electrically connects a transmission pin (e.g., 330-2 and 330-3 or 340-2 and 340-3) of the external electronic device 505 to a data reception terminal (e.g., $P_{RX1}$ or $P_{RX2}$) of the processor 520; a first receiver capacitor (e.g., the first receiver capacitor $C_{RX11}$ or $C_{RX12}$) that blocks power that may be introduced into the reception pin 310-10 and 310-11 or 320-10 and 320-11 of the USB connector 511; and a first transmitter capacitor (e.g., the first transmitter capacitor $C_{TX11}$ or $C_{TX12}$) that blocks power that may be introduced into the transmission pin 310-2 and 310-3 or 320-2 and 320-3 of the USB connector 511. The processor 520 may be configured to detect whether the external electronic device 505 is connected or disconnected based at least partly on a time constant determined by the first transmitter capacitor $C_{TX11}$ or $C_{TX12}$, a second receiver capacitor (e.g., the second receiver capacitor $C_{RX21}$ or $C_{RX22}$) connected to the reception pin 330-10 and 330-11 or 340-10 and 340-11 of the external electronic device 505, and a resistor connected to the reception pin 330-10 and 330-11 or 340-10 and 340-11 of the external electronic device 505 and to the ground of the external electronic device 505.

According to an embodiment, the first receiver capacitor $C_{RX11}$ or $C_{RX12}$ may have a greater value than a second transmitter capacitor $C_{TX21}$ or $C_{TX22}$ connected to the transmission pin 330-2 and 330-3 or 340-2 and 340-3 of the external electronic device 505.

According to an embodiment, the first transmitter capacitors $C_{TX11}$ or $C_{TX12}$ may have a smaller value than the second receiver capacitor $C_{RX21}$ or $C_{RX22}$.

According to an embodiment, the processor 520 may be configured to detect that the external electronic device 505 is disconnected when the time constant is less than a first threshold value.

According to an embodiment, the processor 520 may be configured to detect that the external electronic device 505 is connected when the time constant is equal to or greater than a second threshold value that is greater than the first threshold value.

According to an embodiment, an electronic device (e.g., the electronic device 501) may include a processor (e.g., the processor 520); a USB connector (e.g., the connector 511) including a reception pin (e.g., 310-10 and 310-11 or 320-10 and 320-11) that electrically connects a transmission pin (e.g., 330-2 and 330-3 or 340-2 and 340-3) of an external electronic device (e.g., the external electronic device 505) to a data reception terminal (e.g., $P_{RX1}$ or $P_{RX2}$) of the processor 520; and a first capacitor (e.g., the first receiver capacitor $C_{RX11}$ or $C_{RX12}$) electrically connected to the reception pin 310-10 and 310-11 or 320-10 and 320-11 and to the processor 520 in order to block power that may be introduced into the reception pin 310-10 and 310-11 or 320-10 and 320-11 of the USB connector 511.

According to an embodiment, the electronic device 501 may further include a resistor (e.g., the parallel resistor $R_{RX11}$ or $R_{RX12}$) connected to the reception pin 310-10 and 310-11 or 320-10 and 320-11 and the ground of the electronic device 501. The first capacitor $C_{RX11}$ or $C_{RX12}$ may be configured to have a greater value than a second capacitor (e.g., the second transmitter capacitor $C_{TX21}$ or $C_{TX22}$) connected to the transmission pin 330-2 and 330-3 or 340-2 and 340-3 of the external electronic device 505 in order to detect connection or disconnection of the external electronic device 505 to or from the electronic device 501 based at least partly on a time constant determined by the second capacitor $C_{TX21}$ or $C_{TX22}$ and the resistor $R_{RX11}$ or $R_{RX12}$.

According to the above-described embodiments of the present disclosure, the use of a capacitor connected to a data reception pin of a connector (e.g., a USB connector) or various abnormal voltage cutoff circuits including the capacitor makes it possible to block abnormal voltage (e.g., surge voltage or leakage voltage) or an electric current that may be introduced into the data reception pin by EOS or voltage applied to a $V_{BUS}$ pin, upon data reception from an external electronic device via the connector, and to prevent internal circuits including the connector from being damaged by the abnormal voltage or electric current.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. An electronic device, comprising:
   a power regulator;
   a processor;
   a connector including first power pins that electrically connect an external electronic device with the power regulator, and first data reception pins that are disposed adjacent to at least some of the first power pins and electrically connect second data transmission pins of a connector of the external electronic device with data reception terminals of the processor;
   one or more first receiver capacitors that are electrically connected to the first data reception pins and to the processor in order to block power from leaking into the first data reception pins from the at least some of the first power pins;
   one or more series resistors that are connected in series to the one or more first receiver capacitors;
   one or more parallel resistors that are connected to a front end or a rear end of each of the one or more first receiver capacitors and to a ground of the electronic device such that the one or more parallel resistors are connected in parallel, respectively, to the one or more first receiver capacitors; and
   one or more diodes that are connected to the front end or the rear end of each of the one or more first receiver capacitors and to the ground of the electronic device such that the one or more diodes are connected in parallel, respectively, to the one or more first receiver capacitors.

2. The electronic device of claim 1, wherein the connector is a universal serial bus (USB) type-C connector.

3. The electronic device of claim 1, wherein the first data reception pins comprise a super speed RX negative (SSRXn) pin or a super speed RX positive (SSRXp) pin.

4. The electronic device of claim 1, wherein each of the one or more first receiver capacitors has a greater value than a corresponding second transmitter capacitor connected in series to a corresponding one of the second data transmission pins of the external electronic device.

5. The electronic device of claim 1, wherein each of the one or more first receiver capacitors is set to a value such that a sum of a value of each first receiver capacitor and a value of each second transmitter capacitor of the external electronic device is within a designated range.

6. The electronic device of claim 1, further comprising one or more passive elements connected in series to the one or more first receiver capacitors, respectively.

7. The electronic device of claim 6, wherein the one or more passive elements comprise one or more resistors connected in series to a front end or a rear end of each of the one or more first receiver capacitors.

8. The electronic device of claim 1, further comprising one or more discharge elements, each of which is connected between a ground of the electronic device and one end of one of the one or more first receiver capacitors, so that the one or more discharge elements are connected in parallel to the one or more first receiver capacitors, respectively.

9. The electronic device of claim 8, wherein each of the one or more discharge elements comprises at least one of a resistor, a diode, and a transistor, which is connected in parallel to a corresponding one of the one or more first receiver capacitors between a front end or a rear end of the corresponding one of the one or more first receiver capacitors and the ground.

10. The electronic device of claim 1, wherein the connector further comprises one or more first data transmission pins that electrically connect the second data reception pins of the connector of the external electronic device, respectively, to data transmission terminals of the processor, and
   wherein the electronic device further comprises one or more first transmitter capacitors that are electrically connected, respectively, to the one or more first data transmission pins and to the processor.

11. The electronic device of claim 10, wherein the one or more first data transmission pins comprise an SSTXn pin or an SSTXp pin.

12. The electronic device of claim 10, wherein each of the one or more first transmitter capacitors has a smaller value than a corresponding second receiver capacitor connected in series to a corresponding one of the second data reception pins of the external electronic device.

13. An electronic device, comprising:
   a processor;
   a universal serial bus (USB) connector including a transmission pin that electrically connects a reception pin of an external electronic device to a data transmission terminal of the processor, and a reception pin that electrically connects a transmission pin of the external electronic device to a data reception terminal of the processor;
   a first receiver capacitor that blocks power from the reception pin of the USB connector; and
   a first transmitter capacitor that blocks power from the transmission pin of the USB connector,
   wherein the processor is configured to detect whether the external electronic device is connected or disconnected based on a time constant determined by the first transmitter capacitor, a second receiver capacitor connected to the reception pin of the external electronic device, and a resistor connected to the reception pin of the external electronic device and to a ground of the external electronic device.

14. The electronic device of claim 13, wherein the first receiver capacitor has a value greater than a second transmitter capacitor connected to the transmission pin of the external electronic device.

15. The electronic device of claim 13, wherein the first transmitter capacitor has a value smaller than the second receiver capacitor.

16. The electronic device of claim 13, wherein the processor is further configured to detect that the external electronic device is disconnected, when the time constant is less than a first threshold value.

17. The electronic device of claim 16, wherein the processor is further configured to detect that the external electronic device is connected, when the time constant is greater than or equal to a second threshold value, which is greater than the first threshold value.

18. An electronic device, comprising:
- a processor;
- a universal serial bus (USB) connector including a reception pin that electrically connects a transmission pin of an external electronic device to a data reception terminal of the processor; and
- a first capacitor electrically connected to the reception pin and to the processor in order to block power from the reception pin of the USB connector; and
- a resistor that is connected to the reception pin and a ground of the electronic device,
- wherein the first capacitor is configured to have a value greater than a second capacitor connected to the transmission pin of the external electronic device in order to detect that the external electronic device is connected to or disconnected from the electronic device, based on a time constant determined based on the second capacitor and the resistor.

* * * * *